United States Patent
Sayari et al.

(10) Patent No.: US 7,767,004 B2
(45) Date of Patent: Aug. 3, 2010

(54) FUNCTIONALIZED ADSORBENT FOR REMOVAL OF ACID GASES AND USE THEREOF

(75) Inventors: Abdelhamid Sayari, Ottawa (CA); Peter J. E. Harlick, Gatineau (CA)

(73) Assignee: University of Ottawa, Ottawa, Ontario (CA)

( * ) Notice: Subject to any disclaimer, the term of this patent is extended or adjusted under 35 U.S.C. 154(b) by 0 days.

(21) Appl. No.: 11/908,248

(22) PCT Filed: Mar. 13, 2006

(86) PCT No.: PCT/CA2006/000372
§ 371 (c)(1),
(2), (4) Date: Jul. 18, 2008

(87) PCT Pub. No.: WO2006/094411
PCT Pub. Date: Sep. 14, 2006

(65) Prior Publication Data
US 2008/0276804 A1    Nov. 13, 2008

Related U.S. Application Data

(60) Provisional application No. 60/660,783, filed on Mar. 11, 2005.

(51) Int. Cl.
*B01D 53/02* (2006.01)
(52) U.S. Cl. .............. 95/285; 95/136; 96/108; 55/524; 264/48; 428/305.5; 428/310.5
(58) Field of Classification Search ............... 96/108; 95/136, 285; 55/524; 264/48; 428/305.5, 428/310.5
See application file for complete search history.

(56) References Cited

U.S. PATENT DOCUMENTS

| | | | |
|---|---|---|---|
| 2,818,323 A | 12/1957 | Haensel |
| 3,491,031 A | 1/1970 | Stoneburner |
| 4,810,266 A | 3/1989 | Zinnen et al. |
| 4,999,175 A | 3/1991 | Vansant et al. |
| 5,087,597 A | 2/1992 | Leal et al. |

(Continued)

FOREIGN PATENT DOCUMENTS

CA    2 510 235 A1    12/2003

OTHER PUBLICATIONS

Attard et al. "Liquid-crystalline phases as templates for the synthesis of mesoporous silica" Nature 378:366-368 (1995).

(Continued)

*Primary Examiner*—Robert J Hill, Jr.
*Assistant Examiner*—Christopher P Jones
(74) *Attorney, Agent, or Firm*—Morgan Lewis & Bockius LLP

(57) ABSTRACT

The present invention provides a functionalized adsorbent for removal of acid gases, which comprises a pore-expanded mesoporous support having a pore volume of between 0.7 and 3.6 cc/g, a median pore diameter of between 1 and 25 nm, and a BET surface area of between 500 and 1600 $m^2/g$. The support is functionalized by addition of acid-gas reactive functional groups within the pores and external surface of said support material. Also provided are methods of manufacturing the adsorbent and methods of use.

22 Claims, 14 Drawing Sheets

U.S. PATENT DOCUMENTS

| | | | |
|---|---|---|---|
| 5,527,517 | A | 6/1996 | Bridges et al. |
| 5,876,488 | A | 3/1999 | Birbara et al. |
| 6,326,326 | B1 | 12/2001 | Feng et al. |
| 6,364,938 | B1 | 4/2002 | Birbara et al. |
| 6,406,523 | B1 | 6/2002 | Connor et al. |
| 6,451,095 | B1 | 9/2002 | Keefer et al. |
| 6,531,224 | B1 | 3/2003 | Fryxell et al. |
| 6,547,854 | B1 | 4/2003 | Gray et al. |
| 6,670,304 | B2 | 12/2003 | Chang |
| 6,709,483 | B1 | 3/2004 | Hodgson, Jr. |
| 6,733,835 | B2 | 5/2004 | Fryxell et al. |
| 6,755,892 | B2 | 6/2004 | Nalette et al. |
| 6,846,554 | B2 | 1/2005 | Fryxell et al. |

OTHER PUBLICATIONS

Bagshaw et al. "Templating of mesoporous molecular sieves by nonionic polyethylene oxide surfactants" Science 269(5228):1242-1244 (1995).

Bai et al. "Removal of $CO_2$ greenhouse gas by ammonia scrubbing" Ind. Eng. Chem. Res. 36:2490-2493 (1997).

Beck et al. "A new family of mesoporous molecular sieves prepared with liquid crystal templates" J. Am. Chem. Soc. 114:10834-10843 (1992).

Chang et al. "In-situ infrared study of $CO_2$ adsorption on SBA-15 grafted with γ (aminopropyl)triethoxysilane" Energy & Fuels 17:468-473 (2003).

Che et al. "A novel anionic surfactant templating route for synthesizing mesoporous silica with unique structure" Nature Materials 2:801-805 (2003).

Chien et al. "Removal of $SO_2$ and NO from flue gas by wet scrubbing using an aqueous $NaClO_2$ solution" Journal of Hazardous Materials B80:43-57 (2000).

Chue et al. "Comparison of activated carbon and zeolite 13X for $CO_2$ recovery from flue gas by pressure swing adsorption" Ind. Eng. Chem. Res. 34:591-598 (1995).

Eden et al. "A heat and mass transfer model for the simulation of the wet limestone flue gas scrubbing process" Chem. Eng. Technol. 21(1):56-60 (1998).

Fan et al. "Cubic mesoporous silica with large controllable entrance sizes and advanced adsorption properties" Angew. Chem. Int. Ed. 42:3146-3150 (2003).

Feng et al. "Functionalized monolayers on ordered mesoporous supports" Science 276(5314):923-926 (1997).

Firouzi et al. "Cooperative organization of inorganic-surfactant and biomimetic assemblies" Science 267(5201):1138-1143 (1995).

Fonseca et al. "Dry scrubbing of gaseous HCl with solid lime in a cyclone reactor at low temperatures" Ind. Eng. Chem. Res. 40:304-313 (2001).

Garcia-Bennett et al. "Structural investigations of AMS-n mesoporous materials by transmission electron microscopy" Chem. Mater. 16:813-821 (2004).

Han et al. "High-temperature generalized synthesis of stable ordered mesoporous silica-based materials by using fluorocarbon-hydrocarbon surfactant mixtures" Angew. Chem. Int. Ed. 42:3633-3637 (2003).

Hook "An investigation of some sterically hindered amines as potential carbon dioxide scrubbing compounds" Ind. Eng. Chem. Res. 36:1779-1790 (1997).

Huang et al. "Amine-grafted MCM-48 and silica xerogel as superior sorbents for acidic gas removal from natural gas" Ind. Eng. Chem. Res. 42:2427-2433 (2003).

Huo et al. "Mesostructure design with gemini surfactants: Supercage formation in a three-dimensional hexagonal array" Science 268:1324-1327 (1995).

Huo et al. "Surfactant control of phases in the synthesis of mesoporous silica-based materials" 8:1147-1160 (1996).

Kim et al. "Ultrastable Mesostructured Silica Vesicles" Science 282(5392):1302-1305 (1998).

Kleitz et al. "Cubic Ia3d large mesoporous silica: synthesis and replication to platinum nanowires, carbon nanorods and carbon nanotubes" Chem. Commun. 2136-2137 (2003).

Kleitz et al. "Large cage face-centered-cubic Fm3m mesoporous silica: synthesis and structure" J. Phys. Chem. B 107:14296-14300 (2003).

Koh et al. "Experimental and computer simulation studies of the removal of carbon dioxide from mixtures with methane using AlPO4-5 and MCM-41" Langmuir 15:6043-6049 (1999).

Kruk et al. "A unified interpretation of high-temperature pore size expansion processes in MCM-41 mesoporous silicas" J. Phys. Chem. B 103:4590-4598 (1999).

Kruk et al. "Application of large pore MCM-41 molecular sieves to improve pore size analysis using nitrogen adsorption measurements" Langmuir 13:6267-6273 (1997).

Kruk et al. "Mesoporous silicate-surfactant composites with hydrophobic surfaces and tailored pore sizes" J. Phys. Chem. B 106:10096-10101 (2002).

Kruk et al. "New insights into pore-size expansion of mesoporous silicates using long-chain amines" Microporous and Mesoporous Materials 35-36:545-553 (2000).

Leal et al. "Reversible adsorption of carbon dioxide on amine surface-bonded silica gel" Inorganic Chimica Acta 240:183-189 (1995).

Liu et al. "Room-temperature synthesis in acidic media of large-pore three-dimensional bicontinuous mesoporous silica with Ia3d symmetry" Angew. Chem. Int. Ed. 41(20):3876-3878 (2002).

Lynn et al. "Recovery of anhydrous $Na_2SO_4$ from $SO_2$—scrubbing liquor by extractive crystallization: liquid-liquid equilibria for aqueous solutions of sodium carbonate, sulfate, and/or sulfite plus acetone, 2-propanol, or tert-butyl alcohol" Ind. Eng. Chem. Res. 35:4236-4245 (1996).

Newalkar et al. "Synthesis and characterization of PSU-1, a novel cage-like mesoporous silica" J. Mater. Chem. 13:1710-1716 (2003).

Overcamp "Modeling oxidizing scrubbers for odor control" Environ. Sci. Technol. 33:155-156 (1999).

Prouzet et al. "Assembly of mesoporous silica molecular sieves based on nonionic ethoxylated sorbitan esters as structure directors" Chem. Mater. 11:1498-1503 (1999).

Rinker et al. "Absorption of carbon dioxide into aqueous blends of diethanolamine and methyldiethanolamine" Ind. Eng. Chem. Res. 39:4346-4356 (2000).

Ryoo et al. "Synthesis of ordered and disordered silicas with uniform pores on the border between micropore and mesopore regions using short double-chain surfactants" J. Am. Chem. Soc. 123:1650-1657 (2001).

Sakamoto et al. "Direct imaging of the pores and cages of three-dimensional mesoporous materials" Nature 408:449-453 (2000).

Sartori et al. "Sterically hindered amines for $CO_2$, removal from gases" Ind. Eng. Chem. Fundam. 22(2):239-249 (1983).

Satyapal et al. "Performance and properties of a solid amine sorbent for carbon dioxide removal in space life support applications" Energy & Fuels 15:250-255 (2001).

Sayari "Unprecedented expansion of the pore size and volume of periodic mesoporous silica" Angew. Chem. Int. Ed. 39(16):2920-2922 (2000).

Sayari et al. "Applications of pore-expanded mesoporous silica. 1. Removal of heavy metal cations and organic pollutants from wastewater" Chem. Mater. 17:212-216 (2005).

Sayari et al. "Expanding the pore size of MCM-41 silicas: Use of amines as expanders in direct synthesis and postsynthesis procedures" J. Phys. Chem. B 103:3651-3658 (1999).

Sayari et al. "Highly ordered MCM-41 silica prepared in the presence of decyltrimethylammonium bromide" J. Phys. Chem. B 104:4835-4839 (2000).

Sayari et al. "New approaches to pore size engineering of mesoporous silicates" Adv. Mater. 10(16):1376-1379 (1998).

Sayari et al. "Periodic mesoporous silica-based organic-inorganic nanocomposite materials" Chem. Mater. 13:3151-3168 (2001).

Shen et al. "A novel ordered cubic mesoporous silica templated with tri-head group quaternary ammonium surfactant" Chem. Commun. 2212-2213 (2002).

Tanev et al. "A neutral templating route to mesoporous molecular sieves" Science 267(5199):865-867 (1995).

Tanev et al. "Assembly of mesoporous lamellar silicas with hierarchical particle architectures" J. Am. Chem. Soc. 119:8616-8624 (1997).

Thomas et al. "Nitrogen oxides scrubbing with alkaline solutions" Chem. Eng. Technol. 23(5):449-455 (2000).

Veawab et al. "Corrosion behavior of carbon steel in the $CO_2$ absorption process using aqueous amine solutions" Ind. Eng, Chem. Res. 38:3917-3924 (1999).

Xu et al. "Novel polyethylenimine-modified mesoporous molecular sieve of MCM-41 type as high-capacity adsorbent for $CO_2$ capture" Energy and Fuels 16:1463-1469 (2002).

Xu et al. "Preparation and characterization of novel $CO_2$ "molecular basket" adsorbents based on polymer-modified mesoporous molecular sieve MCM-41" Microporous and Mesoporous Materials 62:29-45 (2003).

Yanagisawa et al. "The preparation of alkyltrimethylammonium-kanemite complexes and their conversion to microporous materials" Bull. Chem. Soc. Jpn. 63(4):988-992 (1990).

Yu et al. "Highly ordered large caged cubic mesoporous silica structures templated by triblock PEO—PBO—PEO copolymer" Chem. Commun. 575-576 (2000).

Zhao "Triblock copolymer syntheses of mesoporous silica with periodic 50 to 300 angstrom pores" Science 279(5350):548-552 (1998).

Zhao et al. "Nonionic triblock and star diblock copolymer and oligomeric surfactant syntheses of highly ordered, hydrothermally stable, mesoporous silica structures" J. Am. Chem. Soc. 120:6024-6036 (1998).

Zhao et al. "Novel mesoporous silicates with two-dimensional mesostructure direction using rigid bolaform surfactants" Chem. Mater. 11:2668-2672 (1999).

Zhou et al. "Sorption and desorption of a minor amount of $H_2S$ on silica gel covered with a film of triethanolamine" Ind. Eng. Chem. Res. 43:1765-1767 (2004).

FUNCTIONALIZED ADSORBENT FOR REMOVAL OF ACID GASES AND USE THEREOF

The present application is a U.S. National Phase Application of International Application No. PCT/CA2006/000372 (filed Mar. 13, 2006) which claims the benefit of U.S. Provisional Application No. 60/660,783 (filed Mar. 11, 2005), both of which are hereby incorporated by reference in their entireties.

FIELD OF THE INVENTION

The present invention pertains to the field of adsorbents and more particularly to the field of functionalized adsorbents for use in dry scrubbing processes for removal of acid gases.

BACKGROUND

While there are several compounds which contribute to the greenhouse effect, carbon dioxide ($CO_2$) has received the most attention, due to its abundance as an effluent in industrial processes. Therefore, the literature has shown a concentration on developing a separation scheme which can efficiently and economically capture and recover the effluent $CO_2$. While the present state of the art for $CO_2$ removal allows for such a process to be applied, the economics of the process are not favourable enough to offset the capture cost. The major obstacle to these processes is the dynamic efficiency of the separation medium being employed; membrane, absorbent, or adsorbent. The most common method of $CO_2$ removal presently used on a large scale is via wet scrubbing (liquid phase absorption).

The use of gas scrubbing processes for environmental protection or for manufacturing of chemicals is widespread in industry (Kohl et al., 1997). Removal of various gaseous pollutants such as volatile organic compounds (VOC), $NO_x$, $SO_x$, HF, HCl, $H_2S$, $CO_2$, phosphine and arsine often takes place via wet scrubbing, typically in counter-current towers using either pure solvents (e.g., water or oil) or solvents containing dissolved materials which may consist of bases (Thomas and Vanderschuren, 2000; Bai Yeh, 1997), salts (Lynn et al., 1996) or oxidants (Overcamp, 1999; U.S. Pat. No. 5,527,517 (1996); Chien and Chu, 2000). There are also "semi-dry" scrubbing processes using a slurry of solid particles which react with targeted species. in the gas phase, ideally in a spray tower (Eden and Luckas, 1998). Dry scrubbing of gaseous acids using finely divided solid sorbents, such as calcium oxide, hydroxide or carbonate in a cyclone reactor was also found, at the laboratory scale, to be highly efficient, particularly when partial recirculation of the solid reactant is achieved (Fonseca et al., 2001).

Carbon dioxide scrubbing is currently used on a large scale for the purification of industrial gases, for example, in natural gas processing and potentially the fuel cell industries. Carbon dioxide is also removed in life support systems in confined space (submarines, space shuttle and other inhabited engines for space exploration). These processes mainly use alkanolamine aqueous solutions (Astarita et al., 1983), the most common being mono- and diethanolamines, (MEA and DEA) and N-methyldiethanolamine (MDEA). The process is reversible, with the formation of carbamate and bicarbonate favoured at low temperature and their dissociation to amine and $CO_2$ favoured at a slightly higher temperature. To maximise the $CO_2$ adsorption capacity, it is therefore important to either enhance the hydrolysis of carbamate or limit its formation.

The use of aqueous solutions of low molecular weight alkanolamines suffers a number of drawbacks (Hook, 1997; Veawab et al., 1999). Under scrubbing conditions, (i) a fraction of the amine and its decomposition products are lost by evaporation, which, in addition to reducing the absorption capacity, may cause problems because of their toxicity, (ii) the amine undergoes oxidative degradation leading to decreased capacity, increased viscosity and excessive foaming, (iii) excessive corrosion takes place, thus posing severe operational problems.

Introduction in the mid-eighties of the so-called sterically hindered amines by Exxon (Sartori and Savage, 1983) mitigated these problems to a great extent. However, such hindered amines exhibit lower rates of $CO_2$ absorption. The use of high-efficiency column internals such as structural packing, or high surface area membranes leads to improved mass transfer coefficients which compensate, at least partly, for the intrinsic low reactivity.

More recently, research has focused on regenerable gas-solid adsorption as an alternative separation technique. Various zeolites and other porous materials have been examined, however many of the adsorbents developed thus far suffer from problems such as low capacity, poor selectivity, poor tolerance to water, and high temperature regeneration or activation. An example of a commercialized adsorbent for $CO_2$ removal from gas streams is zeolite 13X. When used for $CO_2$ separation, this adsorbent requires very stringent moisture control in the inlet gas stream due to its high affinity and adsorption capacity for water. When exposed to water, the material should be regenerated at temperatures between 300° C. and 400° C. in order to recover its high $CO_2$ adsorption capacity.

Solid Supported Amines: The idea of combining amines with solid supports to afford $CO_2$ adsorbents has been examined by several groups as discussed hereafter. The materials were prepared either by grafting of amine containing alkoxysilanes onto the surface of the support or by deposition of amine containing molecules onto the support. Common problems encountered when developing amine loaded solid supports were low capacity for $CO_2$ due the limited quantity of amine retained on the support, operation in a narrow temperature range, and poor thermal stability. The rate and capacity of $CO_2$ adsorption on such adsorbents depend chiefly on the amine loading and the porosity of the material, which are not completely independent since higher amine loadings may be obtained with higher pore volumes.

In the following text, all references to materials on a per gram of support basis ($g_{sup}$) is inferred as a per gram of non-functionalized material, i.e., the support material alone, whereas the reference to a per gram adsorbent basis ($g_{ads}$) is inferred as a per gram of support plus the added functionalization compound(s), i.e., per gram of total adsorbent mass.

Functionalization by Impregnation: Examples of solid materials with impregnated amines are provided in U.S. Pat. Nos. 2,818,323 (1957) and 3,491,031 (1970). In each case, however, these supports are characterized by low adsorption capacity and/or difficulty in regeneration. Similarly, U.S. Pat. No. 4,810,266 (1989) discloses a material for adsorbing $CO_2$, wherein the material is a form of carbon molecular sieve containing a dihydric alcohol amine compound. The materials disclosed exhibited an adsorption capacity of only 2-2.6 wt % (0.46-0.59 mmol/$g_{ads}$) when exposed to a 0.4% $CO_2$ mixture in $N_2$, ca. 6.0 wt % (1.36 mmol/$g_{ads}$) for a 5% $CO_2$ mixture, and 6.45 wt % (1.47 mmol/$g_{ads}$) for a 50% $CO_2$ mixture.

U.S. Pat. No. 4,999,175 (1991) discloses a method and application for separating sulphur compounds using a support material, such as silica, alumina, clay minerals, zeolites or mixtures thereof, having an amine coating. The support material has been characterized by an active amine content of only 5-8 mmol/$g_{sup}$ of support, where the amine is from the group of monoethyleneamine, diethanolamine, and ethylenediamine.

U.S. Pat. No. 5,876,488 (1992) discloses a material, method and application for amine impregnated within an acrylic ester resin porous support, where the preferred amine is DEA and is loaded to the level of 53 wt % (5.05 mmol/$g_{ads}$). The patent indicates that the support material has a surface area of 50-1000 m$^2$/g and an amine content between 35-75 wt % of dry support mass.

Satyapal et al. (2001) describe the use of a material containing amine functionality within the pores of a polymeric resin. The $CO_2$ adsorption capacity of the material for a 2% $CO_2$/$N_2$ feed mixture was reported as 4 wt % gain (0.91 mmol/$g_{ads}$) and as high as 8 wt % (1.82 mmol/$g_{ads}$).

Xu et al. (2002, 2003) describe a mesoporous silica support, MCM-41, impregnated with polyethylene-imine (PEI). Theses studies were conducted using various loading ratios up to a maximum of 75 wt % (PEI+support), which corresponds to an over-saturated pore. The MCM-41 support material used exhibited typical characteristics of a MCM-41 type silica, namely, a pore volume of 1.0 cc/g, pore diameter of 2.75 nm, and a surface area of 1480 m$^2$/g. With these material characteristics, an amine loading of about 1.0 cc/g could be attained at pore saturation, under ideal packing conditions. In terms of $CO_2$ adsorption capacity, it was reported that a maximum 13.3 wt % increase (3.02 mmol/$g_{ads}$) was obtained when exposed to 100% $CO_2$ at 75° C.

The PEI-MCM-41 presented by Xu et al. (2002, 2003) requires an adsorption temperature of 75° C., and a regeneration temperature of 100° C. Within this narrow thermal window, the adsorption and desorption process occurs. At lower temperatures, the material will still adsorb $CO_2$, however, due the viscous nature of the PEI, the rate of adsorption is unacceptably low. If the temperature is increased above 100° C., then unacceptable loss of the impregnated PEI occurs.

U.S. Pat. No. 6,547,854 (2003) discloses a method of immobilizing an amine compound on a solid oxide support. The impregnation method disclosed is a multi-step, multi-component process that is time consuming. Further, the pure $CO_2$ adsorption capacities are described, at best, reported as 0.77 wt % gain (0.175 mmol/$g_{ads}$).

U.S. Pat. No. 6,670,304 (2003) discloses a method for preparing an amine impregnated activated carbon molecular sieve and a use of this material as a water and $CO_2$ adsorbent. The disclosed support material is characterized by a pore diameter of 0.5-1.2 nm, pore volume of 1.5-2.5 cc/g, and a surface area of 2000-2500 m$^2$/g. A 0.5% $CO_2$ adsorption capacity of 4-6 wt % (0.91-1.37 mmol/$g_{ads}$) is described for the temperature range of 15-25° C.

Contarini et al. (2003), and Ital. Pat. ITMI20020536 (2003) describe the impregnation of various alkanolamines and polyamines within the porous structure of silica, silica-zirconia, alumina, and clay supports. The most favourable results were apparently obtained with an alumina support of the following characteristics, pore volume of 1.1 cc/g, median pore diameter of 10.5 nm, and a surface area of 230 m$^2$/g, impregnated to pore saturation with a 50-50% mixture of DEA and N,N'-bis(2-hydroxyethyl)ethylenediamine. For this material a 9.6 wt % (2.18 mmol/$g_{ads}$) increase was obtained at equilibrium with 100% $CO_2$, and exhibited a total organic content of about 50 wt %. The disclosed material also did not demonstrate favourable desorption properties.

Zhou et al. (2004), and Chinese Patent 02117914 (2003) relate to the impregnation of triethanolamine within the pores and on the surface of a type of silica gel. The target separation is for the removal of $H_2S$ from methane. Silica gel with a pore volume of 0.85 cc/g, pore diameter of 10 nm, and a surface area of 335 m$^2$/g was used as the support material.

Functionalization by Post-Synthesis Grafting: Feng, et al. (1997), and U.S. Pat. Nos. 6,326,326 (2001), 6,531,224 (2003), 6,733,835 (2004), 6,846,554 (2005) describe a method to produce a uniform monolayer of functionalized silane on a mesoporous support. Specifically, water was used to wet the entire surface area of the support material thereby facilitating the formation of a complete monolayer. Further disclosed was the application of post-grafting distillation to remove the produced alkanol and water azeotrope and, thus drive the silane reaction to completion. This approach was applied to a mesoporous silica characterized by a pore diameter of 5.5 nm and surface area of 900 m$^2$/g. The grafting was carried out under an inert atmosphere, with toluene as the solvent, and at a temperature of 110° C., under reflux. This material was functionalized with a mercapto-silane compound and was used for the removal of heavy metals from water.

Chuang et al. (2003) studied the adsorption mechanism of $CO_2$ when interacting with a primary amine site grafted on a so-called SBA-15 silica. The SBA-15 material was characterized by a low surface area of 200-230 m$^2$/g. The performance of the material when subjected to a 4% $CO_2$/He gas mixture was reported as 1.76 wt % increase (0.40 mmol/$g_{ads}$).

Leal et al. (1995), and U.S. Pat. No. 5,087,597 (1992) disclose an amino-silane functionalized silica gel and its application to the separation of $CO_2$ from air in confined spaces. The support material was characterized by a pore diameter of 6 to 18 nm, pore volume of 0.4 to 0.8 cc/g, and a surface area of between 120 and 240 m$^2$/g. The material was described as having an adsorption capacity of between 1.47 and 2.30 wt % gain (0.33-0.52 mmol/$g_{ads}$) when exposed to a dry, pure $CO_2$ environment. The patent also discloses the method to produce the functionalized material.

Huang et al. (2003) demonstrate relatively high $CO_2$ adsorption capacities for an amine grafted material. They examined the effect of functionalizing MCM-48 and silica xerogel with aminopropyltriethoxysilane. The MCM-48 support material was characterized by a surface area of 1389 m$^2$/g, and the xerogel was characterized by a surface area of 816 m$^2$/g. The aminopropyltriethoxysilane grafting was performed with toluene as the solvent and an inert gas head space, and in the absence of water at 70° C. for 18 hours, with reflux. The resulting amine grafted quantities were 1.7 mmol/$g_{ads}$ (9.9 wt %) for the xerogel, and 2.3 mmol/$g_{ads}$ (13.3 wt %) for the MCM-48, materials based on the propylamine chain. The corresponding 5% $CO_2$/$N_2$ adsorption capacities were determined as 1.14 mmol/$g_{ads}$ (5.0 wt %) for the amino-MCM-48, and 0.45 mmol/$g_{ads}$ (1.96 wt %) for the amino-xerogel.

There remains a need, however, for improved, regenerable materials with high adsorption capacity and rate, and with tolerance to moisture.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a functionalized adsorbent for removal of acid gases and use thereof. In accordance with one aspect of the present invention there is provided a pore-expanded mesoporous support having a pore volume of between 0.7 and 3.6 cc/g, a median pore diameter of between 1 and 25 nm, and a BET surface area of between 500 and 1600 m²/g.

In accordance with another aspect of the present invention there is provided a regenerable acid-gas adsorbent comprising a pore-expanded mesoporous support having a pore volume of between 0.7 and 3.6 cc/g, a median pore diameter of between 1 and 25 nm, and a BET surface area of between 500 and 1600 m²/g, which support is functionalized by addition of acid-gas reactive functional groups within the pores and external surface of said support material.

In one example, for a mono-aminosilane functionalized grafted material, the 5% $CO_2/N_2$ equilibrium weight gain was 10.8 wt % (2.46 mmol/$g_{ads}$), for a di-aminosilane functionalized grafted material, the $CO_2$ equilibrium weight gain was 11.8 wt % (2.68 mmol/$g_{ads}$), and for a tri-aminosilane functionalized grafted material the weight gain was 12.8 wt % (2.91 mmol/$g_{ads}$).

In another example, for a diethanolamine impregnated material, the $CO_2$ equilibrium weight gain was 12.5 wt % (2.84 mmol/$g_{ads}$), and for an aminoethylaminoethanol impregnated material the weight gain was 18.5 wt % (4.21 mmol/$g_{ads}$).

In accordance with another aspect of the present invention there is provided a method for removing or recovering acid gas from an gaseous stream or atmosphere containing said acid gas, comprising the step of contacting the gaseous stream or atmosphere with an adsorbent comprising a pore-expanded mesoporous support having a pore volume of between 0.7 and 3.6 cc/g, a median pore diameter of between 1 and 25 nm, and a BET surface area of between 500 and 1600 m²/g, which support is functionalized by addition of acid-gas reactive functional groups within the pores and external surface of said support material.

In accordance with another aspect of the present invention there is provided a process for manufacturing an adsorbent, comprising: (a) providing a pore-expanded mesoporous support having a pore volume of between 0.7 and 3.6 cc/g, a median pore diameter of between 1 and 25 nm, and a BET surface area of between 500 and 1600 m²/g; and (b) grafting a functionalization compound, which contains one or more acid-gas reactive groups, to the surface of the pores of said support material; or (c) directly loading a functionalization compound, which contains one or more acid-gas reactive groups, into the pores of said support material.

DETAILED DESCRIPTION OF THE INVENTION

Figure 1:
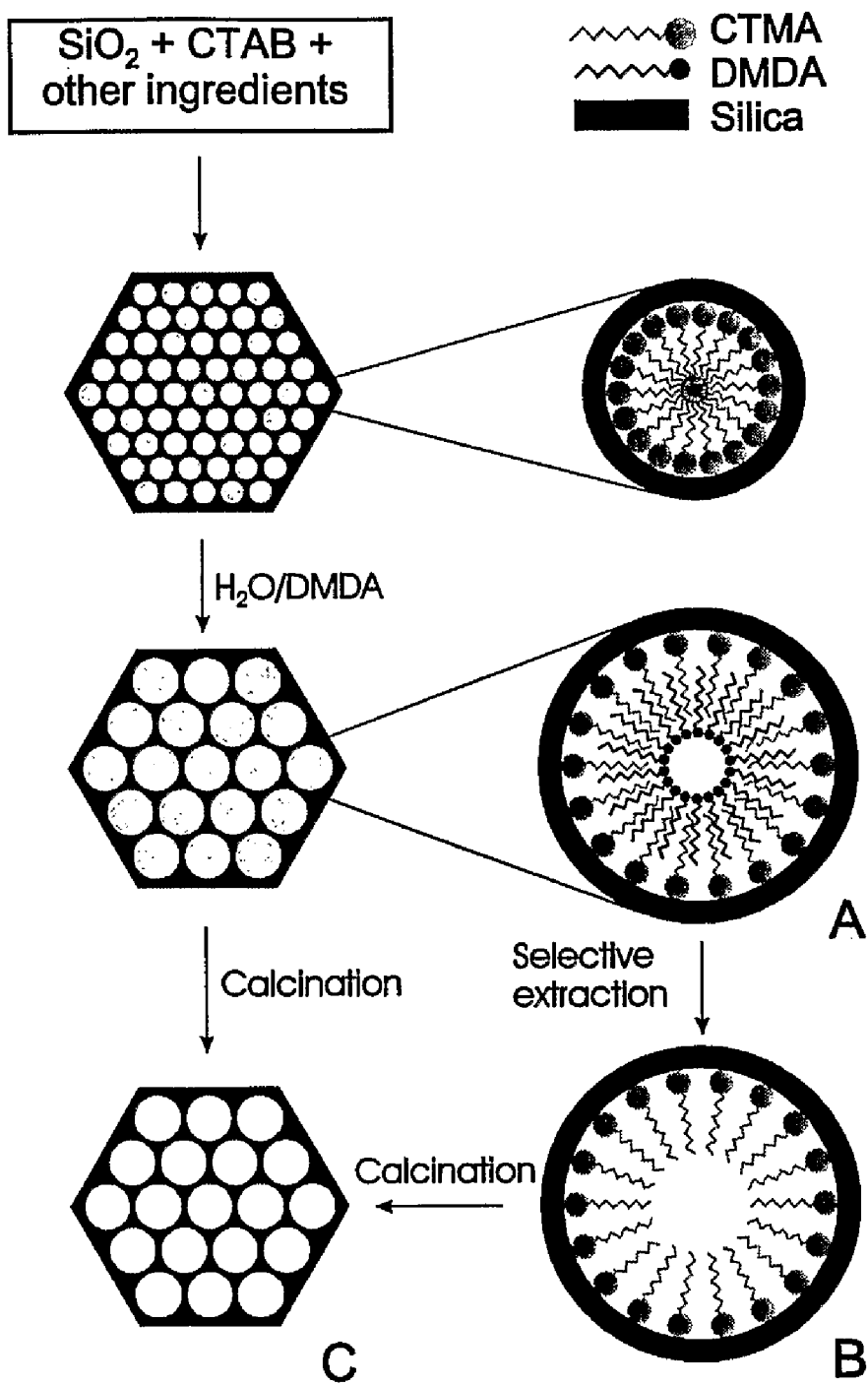
FIG. 1 is a schematic representation of MCM-41 pore-expansion.

The present invention relates to efficient removal of acid gases, for example, from dry or humid process streams, or atmospheres, by selective adsorption using an adsorbent consisting of a functionalized mesoporous silica or framework modified mesoporous silica support material. The mesoporous support material is characterized by a total pore volume of between 0.7 to 3.6 cc/g, a median pore diameter of 1 through 25 nm, and a total BET surface area of between 500 and 1600 $m^2/g$. The pore volume, pore diameter and surface area combination of the mesoporous support material of the present invention is enlarged in comparison to other typical periodic mesoporous silica materials (e.g. MCM-41, SBA-n and MCM-48) previously known.

Components of the Adsorbent

The adsorbent of the present invention can be prepared using various methods, including those outlined herein, in order to obtain material having varying capacities and rates of adsorption depending on the downstream application of the material. In each case the adsorbent comprises mesoporous silica or framework modified mesoporous silica that has been adapted to contain functional groups that remain accessible to the adsorbate.

Mesoporous Silica

Mesoporous silicas and framework modified mesoporous silicas are prepared in the presence of surfactants or polymer solutions via different pathways including the so-called cooperative organization mechanism (Firouzi et al., 1995) and the liquid crystal templating mechanism (Attard et al., 1995). They may exhibit different structures and pore systems, the most prominent being the so-called MCM-41 with a two-dimensional hexagonal symmetry. Table 1 provides a non-limiting list of mesoporous silicas and framework modified mesoporous silicas, prepared under different pH conditions using different amphiphile molecules, that can be used as the support of the adsorbents described in the present invention.

TABLE 1

Mesoporous Silicas and Organosilicas

| Mesophase | Amphiphile template | pH | Structure | Ref. |
|---|---|---|---|---|
| MCM-41 | $C_nH_{2n+1}(CH_3)_3N^+$ | basic | 2D hexagonal (p6mm) | [1] |
| MCM-48 | $C_nH_{2n+1}(CH_3)_3N^+$ | basic | cubic (Ia$\bar{3}$d) | [1] |
| | Gemini $C_{n-s-n}{}^a$ | | | [2] |
| FSM-16 | $C_{16}H_{31}(CH_3)_3N^+$ | basic | 2D hexagonal (p6mm) | [3] |
| SBA-1 | $C_{18}H_{37}N(C_2H_5)_3{}^+$ | acidic | cubic (Pm$\bar{3}$n) | [2] |
| SBA-2 | Divalent $C_{n-s-1}{}^b$ | acidic/basic | 3D hexagonal (P6$_3$/mmc) | [2] |
| SBA-3 | $C_nH_{2n+1}N(CH_3)_3{}^+$ | acidic | 2D hexagonal (p6mm) | [4] |
| SBA-6 | Divalent 18B$_{4-3-1}{}^c$ | basic | cubic (Pm$\bar{3}$n) | [5] |
| SBA-8 | Bolaform$^d$ | basic | 2D rectangular (cmm) | [6] |
| SBA-11 | Brij® 56; $C_{16}EO_{10}$ | acidic | cubic (Pm$\bar{3}$m) | [7] |
| SBA-12 | Brij® 76; $C_{18}EO_{10}$ | acidic | 3D hexagonal (P6$_3$/mmc) | [7] |
| SBA-14 | Brij® 30; $C_{12}EO_4$ | acidic | cubic | [7] |
| SBA-15 | P123; $EO_{20}PO_{70}EO_{20}$ | acidic | 2D hexagonal (p6mm) | [8] |
| KIT-6 | P123 + Butanol | acidic | cubic (Ia$\bar{3}$d) | [9] |
| JLU-20 | P123 + FC-4$^e$ | acidic | 2D hexagonal (p6mm) | [10] |
| PSU-1 | P123 + CTAC1 | acidic | 2D hexagonal (p6mm) | [11] |
| Mesocellular | P123 + TMB$^f$ | acidic | disordered | [12] |
| SBA-16 | F127; $EO_{106}PO_{70}EO_{106}$ | acidic | cubic (Im$\bar{3}$m) | [7] |
| KIT-5 | F127 | acidic | cubic (Fm$\bar{3}$m) | [13] |
| FDU-12 | F127 + additives$^g$ | acidic | cubic (Fm$\bar{3}$m) | [14] |
| FDU-1 | B50-6600; $EO_{39}BO_{47}EO_{39}$ | acidic | cubic (Im$\bar{3}$m) | [15] |
| FDU-2 | $RN^+N^+N^{+h}$ | basic | cubic (Fd3m) | [16] |
| FDU-5 | P123 + additives$^i$ | acidic | cubic (Ia$\bar{3}$d) | [17] |
| AMS-n | Anionic surfactant | basic | AMS-1: 3D hexagonal | [18, 19] |
| | | | AMS-2: 2D cubic | |
| | | | AMS-3: 2D hexagonal | |
| | | | AMS-4: 3D cubic | |
| | | | AMS-6: 3D cubic | |
| | | | AMS-7: 3D disordered | |
| | | | AMS-8: 3D cubic | |
| MSU-1 | Tergitol; $C_{11-15}(EO)_{12}$ | neutral | disordered | [20] |
| MSU-2 | TX-114; $C_8Ph(EO)_8$ | neutral | disordered | [20] |
| | TX-100; $C_8Ph(EO)_{10}$ | | | |
| MSU-3 | P64L; $EO_{13}PO_{30}EO_{13}$ | neutral | disordered | [20] |
| MSU-4 | Tween®-20, 40, 60, 80 | neutral | disordered | [21] |
| MSU-V | $H_2N(CH_2)_nNH_2$ | neutral | lamellar | [22] |
| MSU-G | $C_nH_{2n+1}NH(CH_2)_2NH_2$ | neutral | lamellar | [23] |
| HMS | $C_nH_{2n+1}NH_2$ | neutral | disordered | [24] |

EO = ethylene oxide;
PO = propylene oxide.
$^a$Gemini surfactants $C_{n-s-n}$: $C_nH_{2n+1}N^+(CH_3)_2(CH_2)_sN^+(CH_3)_2C_nH_{2n+1}$.
$^b$Divalent surfactants $C_{n-s-1}$: $C_nH_{2n+1}N^+(CH_3)_2(CH_2)_sN^+(CH_3)_3$.
$^c$Divalent surfactant 18B$_{4-3-1}$: $C_{18}H_{37}O-C_6H_4-O(CH_2)_4N^+(CH_3)_2(CH_2)_3N^+(CH_3)_3$.
$^d$Bolaform surfactants: $(CH_3)_3N^+(CH_2)_nO-C_6H_4-C_6H_4-O(CH_2)_nN^+(CH_3)_3$.
$^e$FC-4: $(C_3F_7O(CFCF_3CF_2O)_2CFCF_3CONH(CH_2)_3N^+(C_2H_5)_2CH_3I^-$.
$^f$TMB: trimethylbenzene.
$^g$Additives = TMB and KCl.
$^h$Tri-head group surfactant: $C_{16}H_{33}N^+(CH_3)_2(CH_2)_2N^+(CH_3)_2(CH_2)_3N^+(CH_3)_3$.
$^i$Additives = 3-mercaptopropyl-trimethoxysilane (MPTS) and benzene, or a benzene derivative (methyl-, ethyl-, dimethyl-, or trimethylbenzene).

TABLE 1 REFERENCES

1. J. S. Beck, J. C. Vartuli, W. J. Roth, M. E. Leonowicz, C. T. Kresge, K. D. Schmitt, C.T-W. Chu, D. H. Olson, E. W. Sheppard, S. B. McCullen, J. B. Higgins and J. L. Schlenker, *J. Am. Chem. Soc.* 114 (1992) 10834.
2. Q. Huo, R. Leon, P. M. Petroff and G. D. Stucky, *Science* 268 (1995) 1324.
3. T. Yanagisawa, T. Shimizu, K. Kuroda and C. Kato, *Bull. Chem. Soc. Jpn.* 63 (1990) 988.
4. Q. Huo, D. I. Margolese and G. D. Stucky, *Chem. Mater.* 8 (1996) 1147.
5. Y. Sakamoto, M. Kaneda, O. Terasaki, D. Zhao, J. M. Kim, G. D. Stucky, H. J. Shin and R. Ryoo, *Nature* 408 (2000) 449.
6. D. Zhao, Q. Huo, J. Feng, J. Kim, Y. Han and G. D. Stucky, *Chem. Mater.* 11 (1999) 2668.
7. D. Zhao, Q. Huo, J. Feng, B. F. Chmelka and G. D. Stucky, *J. Am. Chem. Soc.* 120 (1998) 6024.
8. D. Zhao, Q. Huo, J. Feng, B. F. Chmelka and G. D. Stucky, *Science* 279 (1998) 548.
9. F. Kleitz, S. H. Choi and R. Ryoo, *Chem. Commun.* (2003) 2136.
10. Y. Han, D. Li, L. Zhao, J. Song, X. Yang, N. Li, Y. Di, C. Li, S. Wu, X. Xu, X. Meng, K. Lin and F.-S. Xiao, *Angew. Chem. Int. Ed. Engl.* 42 (2003) 3633.
11. B. L. Newalkar, S. Komarneni, U. T. Turaga and H. Katsuki, *J. Mater. Chem.* 7 (2003) 1710.
12. P. Schmidt-Winkel, W. W. Lukens, Jr., D. Zhao, P. Yang, B. F. Chmelka and G. D. Stucky, *J. Am. Chem. Soc.* 121 (1999) 254.
13. F. Kleitz, D. Liu, G. M. Anilkumar, I.-S. Park, L. A. Solovyov, A. N. Shmakov and R. Ryoo, *J. Phys. Chem. B.* 107 (2003) 14296.
14. J. Fan, C. Yu, F. Gao, J. Lei, B. Tian, L. Wang, Q. Luo, B. Tu, W. Zhou and D. Zhao, *Angew. Chem. Int. Ed. Engl.* 42 (2003) 3146.
15. C. Yu, Y. Yu and D. Zhao, *Chem. Commun.* (2000) 575.
16. S. Shen, Y. Li, Z. Zhang, J. Fan, B. Tu, W. Zhou and D. Zhao, *Chem Commun.* (2002) 2212.
17. X. Liu, B. Tian, C. Yu, F. Gao, S. ie, B. Tu, R. Che, L.-M. Peng and D. Zhao, *Angew. Chem. Int. Ed. Engl.* 41 (2002) 3876.
18. S. Che, A. E. Garia-Bennett, T. Yokoi, K. Sakamoto, H. Kumieda, O. Terasaki, T. Tatsumi, *Nature Mater.* 2 (2003) 801.
19. A. E. Garia-Bennett, O. Terasaki, S. Che, T. Tatsumi, *Chem. Mater.* 16 (2004) 813.
20. S. A. Bagshaw, E. Prouzet and T. J. Pinnavaia, *Science* 269 (1995) 1242.
21. E. Prouzet, F. Cot, G. Nabias, A. Larbot, P. Kooyman and T. J. Pinnavaia, *Chem. Mater.* 11 (1999) 1498.
22. P. T. Tanev, Y. Liang and T. J. Pinnavaia, *J. Am. Chem. Soc.* 119 (1997) 8616.
23. S. S. Kim, W. Zhang and T. J. Pinnavaia, *Science* 282 (1998) 1302.
24. P. T. Tanev and Pinnavaia, *Science* 267 (1995) 865.

Mesoporous silica is prepared using standard techniques (Table 1) known to those skilled in the art, for example, in the presence of alkyltrimethylammonium surfactants using literature procedures (Sayari, 1996). Different methods for pore size engineering can be used, including, but not limited to the use of auxiliary organic molecules such as trimethylbenzene (Beck et al., 1992), the post-synthesis treatment with long chain tertiary amines (Sayari et al., 1998; Sayari et al., 1999; Sayari, 2000) or the use of various mixed surfactants (Ryoo et al., 2001).

In selecting suitable support material several criteria are considered, including, but not limited to, the ease of support manufacture, total manufacture cost, possibility of structure directing agent recovery and reuse, support reliability in terms of moisture degradation resistance, and thermal and mechanical stability, the range of pore structures available (i.e., pore characteristics: diameter, volume, and surface area), adaptability and susceptibility to post-synthesis pore expansion, and the ability of surface modification.

The mesoporous silicas or framework modified mesoporous silicas of the present invention are pore enlarged through the use of an organic expander compound. The pore expansion process may be achieved during the synthesis of the mesoporous material or by post-synthesis treatment. Direct pore expansion uses, typically, but not exclusively, aromatic molecules such as trimethylbenzene as the pore expander. Post-synthesis expansion uses, typically, but not exclusively, long chain N,N-dimethylalkylamines such as N,N-dimethyldecylamine (Sayari et al., 1998; Kruk et al., 1999). The mesoporous support material is then treated to remove the structure directing surfactant, and organic expander compound, either by heat treatment or extraction. This organic free, pore-enlarged mesoporous material is then functionalized (as described herein), with one or more types of compounds, in order to realize an acid gas selective adsorbent or $CO_2$ selective adsorbent. Support materials that are suitable for use in the present invention exhibit high surface areas and pore volumes to enable high loading of adsorption sites, and provide sufficiently large pores to enable relatively unhindered flow of $CO_2$, or other acid gas containing gaseous streams inside the pore system.

Functionalization Compounds

In accordance with the present invention, the mesoporous support material is functionalized such that it contains functional groups, such as amino groups, that are accessible to the adsorbate and are reactive with one or more acid gases.

Functionalization compounds that can be used for impregnation may consist of any high boiling point substance that remains active when occluded within the porous structure of the support materials. Amine bearing compounds that can be applied to the present invention include, but are not limited to, alkylamines, alkanolamines, polyamines, aromatic amines, hydrazines, and imines, which may contain one or more amine species of the type of primary, secondary, or tertiary, and may be impregnated as a single compound or a mixture of various amine compounds. Exemplary amines include, diethanolamine, methyl-diethanolamine, dipropanolamine, aminoethylaminoethanol, tri-ethylene-tetra-amine, and tetra-ethylene-penta-amine.

Compounds that can be used as the solvent (carrier) during the impregnation procedure are selected from the group of low boiling point liquid substances. These include, but are not limited to the following, water, alkanes, alkenes, alkynes, alcohols, aromatics, ketones, aldehydes, ethers, and nitriles. Methanol and ethanol are specific examples of suitable solvents. It should also be understood that these solvents may be used in their pure state, or as a mixture of two or more of the various solvents.

Functionalization compounds that can be used for post-synthesis grafting may consist of any alkoxy or chloro-silane or silanol based substance that reacts with the surface of the porous structure of the support materials. Examples of amine bearing compounds are amino-alkyl silanes which contain mono, di, or tri, alkoxy or chloro groups which are intended for reaction with the surface. Specific compounds include, aminopropyl-methyl-dimethoxysilane, aminopropyl-trimethoxysilane, aminoethylaminopropyl-methyl-dimethoxysilane, aminoethylaminopropyl-trimethoxysilane, aminoethylaminoethylaminopropyl-methyl-dimethoxysilane, aminoethylaminoethylaminopropyl-trimethoxysilane It should be understood that, although the use of methoxy and methyl groups has been mentioned, substitution of these groups with other groups such as ethoxy, or other alkoxy compounds, chloro groups, organic chains, and hydroxyl groups, is considered to be within the scope of the present invention.

Compounds that can be used as the solvent (carrier) during the grafting procedure are selected from the group of alkanes, alkenes, and alkynes, alcohols, aromatics, ketones, aldehydes, ethers, and nitriles. Toluene is a specific example of a suitable solvent. It should also be understood that these solvents may be used in their pure state, or as a mixture of two or more of the various solvents.

It should also be understood that, although amine bearing compounds have specifically been mentioned, any compound that provides a desired functionality is well within the scope of this invention. For example, thiols, hydrocarbon chains, halogenated hydrocarbon chains, carboxylic acids, enzymes, and enzyme related species, or other compounds known to those in the art can be used in the functionalized adsorbent of the present invention. Further, combinations of two or more of these compounds are also considered to lie within the scope of this invention.

Amines

Amines used in the preparation of the adsorbent of the present invention must exhibit sufficient basicity to allow for efficient reaction with $CO_2$, or other acid gas to be adsorbed. In addition a high N/C ratio can be beneficial to maximizing the concentration of amine groups added to the mesoporous silica. In order to allow effective regeneration of the adsorbent, the adsorbent should be thermally stable during the desorption process.

The amines can be primary amines, secondary amines, tertiary amines, mixed amines or any combination thereof. As shown in the following section, amines can be added to the support by (i) grafting using amine-containing alkoxy- or chloro-silanes, or (ii) direct loading by impregnation.

Selection of the specific amine or amines to be used in the preparation of the adsorbent of the present invention will depend on the configuration, of the adsorbent and on the application for which the adsorbent is intended. For example, in cases where a high equilibrium adsorptive capacity is not required, rather a high dynamic capacity is sought, then the amine or amines will be selected keeping in mind characteristics such as high regeneration ability, low cost and ready availability rather than maximum reactivity. In general, primary and secondary amines are more reactive with acidic gases than tertiary amines. Similarly, primary amines are generally more reactive than secondary amines. As described below, the configuration of the adsorbent may impose limitations on the nature of the amine that can be used. Any amine-containing alkoxy- or chloro-silane may be used for post-synthesis grafting.

Method of Functionalization

Grafting: In one specific embodiment of the invention, the pore-enlarged mesoporous material is functionalized with an amino-silane compound. The method of amino-silane functionalization is via post synthesis grafting with various amino-silane compounds. A further method of preparation includes the use of other silane compounds, such as chlorinated silanes, and then further reaction with the appropriate amino compound to produce the active amine chain. A further method includes the use of pre-reaction of the silane compound with the desired amino-compound and then grafting the resulting amino-silane complex to the mesoporous support via reaction with the surface hydroxyl groups and formation of covalent bonds. Preferably, the amine chain contains at least one primary, secondary, or tertiary amine group. More preferably the amine contains at least one primary amine group, in the case of $CO_2$ adsorption. In a specific example, the silane compound contains at least one alkoxy group and at least one amino-alkyl chain.

The temperature of the post synthesis grafting process is selected, at least in part, based on the temperature ratio, which is defined as the ratio of grafting temperature to the boiling point of the grafting solvent under the pressure conditions employed in the process. Generally, the grafting temperature is selected such that the temperature ratio is in the range of 0.1 to 1.0, preferably between 0.15 and 1.0 and most preferably between 0.5 and 0.85. In the specific example, in which toluene is the grafting solvent, the temperature ratio should be within the range of 0.68 to 0.82.

The amount of silane functionalization compound employed in the grafting process is determined, at least in part, based on the silane to silica ratio on a volume to weight basis (i.e., cc(silane)/g(silica)). The silane to silica ratio should be in the range of 0.0001 to 10, preferably in the range of 1.0 to 5.0 and most preferably in the range of 2.0 to 4.0.

In the post synthesis grafting method, the use of a layer of water within the mesoporous support greatly affects the quantity of silane which can be grafted. Specifically, the present invention is characterized by the use of 0-100 wt % water addition relative to the weight of the mesoporous support. More specifically, the optimum water content varies depending on the silane grafting agent, and the hydroxyl content of the support material. For mono-aminosilane grafted onto PE-MCM-41, up to 50 wt % water addition, and for multi-amine aminosilane, up to 40 wt % water addition. When, the functionalization compound employed is an alkoxy-silane, the amount of water employed in the grafting process can be characterised by the ratio of the molar amount of water per molar amount of alkoxy groups present in the silane. By way of example, when toluene is used as the solvent, the water addition should be in the range of 0.0 to 1.0, preferably in the range of 0.05 to 0.5, and most preferably in the range of 0.15 to 0.5, depending on the type of silane to be grafted. The optimum water ratio is dependent on (i) the ability of the silane to graft to the silica substrate, where a baseline value can be obtained by determining the amount grafted under anhydrous conditions, i.e., $H_2O$/alkoxy molar ratio of 0.0; and (ii) the type of solvent used. The solubility of $H_2O$ in the solvent will effect the optimum quantity of $H_2O$ required. For example if the water solubility in the chosen solvent is lower than that for toluene, the preferable range of this ratio will be reduced.

The effect of the water addition is manifested in the condensation of the alkoxy-silane groups with the surface hydroxyl groups to form a cross-linked surface layer, as well as the possible polymerization of the free alkoxy ligands to form a structural coating of amino-silane within the porous structure in three dimensional spaces, as opposed to only surface functionalization. With this type of functionalization, the final material is capable of accommodating a much higher quantity of amine, than those obtained through the use of other smaller pore and pore-volume materials.

The grafting procedure is also characterized by the ability to use low cost solvents, and imposing 25-150° C. functionalization temperature. For example, when grafting with toluene as the solvent the procedure should be carried out at 75-90° C., under reflux, and the use of a protective atmosphere may be employed, although not required. The grafted material is characterized by the amount of grafted aminoalkyl chain, and is in the range of 5-75 wt % by mass of the dry final product or 5-300 wt % of the dry silica support mass.

Direct loading: In another embodiment of the invention, the pore-enlarged mesoporous material is functionalized with amine compounds via direct loading. The method of functionalization of the support may be through the use of incipient wetness, spray coating, vapour deposition, or other techniques known to those in the art. The occluded amine may be of the form of primary, secondary, tertiary, or combinations of these types within the same parent compound. Preferably, the amine should contain at least one primary or secondary amine site, and exhibit sufficiently low volatility at the process conditions. More preferably, the occluded amine should contain at least one secondary amine, and at least one hydroxyl group. Examples of these amine types include but are not limited to, methyldiethanolamine (MDEA), diethanolamine (DEA), diisopropanolamine (DiPA) and aminoethylaminoethanol (AEAE). Further, the amount of occluded amine is in the range of 20-85% by mass of the final product or 25-630% of the silica support mass.

Characterization of the Adsorbent

The performance of the material is characterized by an equilibrium weight gain of $CO_2$ in the range of 3-30 wt % (0.68-6.80 mmol/$g_{ads}$) when exposed to a dry or humid 5% $CO_2/N_2$ mixture at atmospheric pressure and a temperature of 25° C.

When exposed to a stream of humid $CO_2$, the functionalized pore-expanded support of the present invention exhibits no loss in $CO_2$ adsorption capacity, however, due to the possible formation of bicarbonates, some $CO_2$ adsorption enhancement may occur.

The functionalized pore-expanded support is also characterized by the rate of adsorption, and desorption. For $CO_2$ uptake, the rate of adsorption is strongly related to the amine type and weakly related to the total quantity of amine occluded within the support. For grafted materials, the maximum rate of adsorption was generally twice that of the commercially available zeolite material 13X (produced in mass by UOP, CECA, and Zeochem). For the impregnated materials, the rate of adsorption was at least equal to the dynamic performance exhibited by zeolite 13X. At low occluded amine loadings (for example, at least 25% below the total pore volume), the rate of adsorption was enhanced as compared to competing materials. While not wishing to be bound by any theory, it is believed that this enhancement of adsorption capacity and adsorption rate is due to the enlarged pore diameter and volume, and high surface area of the support material. Again, while not wishing to be bound by any theory, it is believed that a greater quantity of amine can be occluded due to the enlarged pore diameter and volume of the present invention. This feature, allows for a higher adsorption capacity when the occluded amine content approaches the limit of pore saturation. Furthermore, the present invention permits a greater degree of $CO_2$ mobility within the support structure, as compared to supports described in the literature. These characteristics result in higher apparent adsorption rates, and thus higher attainable process throughput, due to the reduced time required to reach equilibrium, or the desired fractional amount adsorbed.

The desorption performance of the present invention is also enhanced relative to materials described in the literature. When zeolite 13X is used for $CO_2$ removal, a high temperature activation (ca. 400° C.) of the material is required to eliminate all pre-adsorbed compounds, in particular, any moisture. In contrast, a mild regeneration temperature of 75-150° C. is sufficient for complete regeneration to occur in the case of the present invention. Additionally, when the material is subjected to repeated adsorption-desorption cycling, a low temperature thermal spike of 75-150° C. is sufficient to remove adsorbed $CO_2$ and/or water, and thereby prepare the material for the next adsorption cycle.

Use of the Adsorbent

The present invention further provides a method and a system for removing $CO_2$ and/or other acid gases, such as $H_2S$, from a gaseous stream or atmosphere containing one or more of these gases. For simplicity, the discussions herein specifically refer to $CO_2$ as the acid gas, however, it should be understood that the adsorbent can be used to remove any acid gas from a gaseous stream containing the acid gas.

Once the adsorbent has been synthesized, it can be employed in a sorbent bed for use in a cyclic adsorption process. To apply the adsorbent of the present invention to such a cyclic adsorption process, it must be formed into a stable, mechanically strong form. These forms may include, but are not limited to, powder forms, pellet forms and or monolithic structures or foams. In the case of pellet forms, the adsorbent is mixed with a suitable inert or active secondary material as a binder. Criteria for selecting a suitable binder can include (i) achieving pellets or extrudates with minimum amount of binder; (ii) enhanced mechanical stability; (iii) preservation of adsorbent porosity and accessibility of adsorption sites; and (iv) affordability. For example, siloxanes and siloxane derivatives can be employed to form structured pellets, either extrudates or spheres, using the appropriate weight percentage of additive. The selection of the appropriate form and, if necessary, additive, is based on the intended application of the adsorbent and the type of equipment used in the scrubbing process. The selection and manufacture of the adsorbent form is well within the ordinary abilities of a worker skilled in the art.

The adsorbent of the present invention may be applied, in a suitable form, as a replacement for sorbents currently employed in all processes that target the removal, and/or recovery of acid gases from various sources. These markets include, but are not limited to, confined space closed loop systems, open or semi open loop systems, natural gas treatment processes, fossil fuel combustion processes, biogas combustion systems, biogas derived processes, industrial processes involving the removal of acid gases from gaseous streams. The present invention may also be applied in the chemical production industry which utilizes catalysts possessing basic properties. It should be understood that the processes referred to herein are only intended to convey some of the possible applications of the present invention, and are not intended to cover all the possible current and future applications of the present invention.

To gain a better understanding of the invention described herein, the following examples are set forth. It should be understood that these examples are for illustrative purposes only. Therefore, they should not limit the scope of this invention in any way.

EXAMPLES

Example 1

Adsorbent Prepared Using Direct Loading: The present example makes use of periodic mesoporous silica (PE-MCM-41) whose pores have been further expanded through postsynthesis treatment as described elsewhere (Sayari et al., 1998; Sayari et al., 1999; Kruk et al., 1999; Sayari, 2000; Kruk et al., 2000; Kruk et al., 2002). As shown in FIG. 1, the PE-MCM-41 silica used in this study was prepared using a two-step methodology consisting of (i) synthesis of MCM-41 at relatively low temperature, typically 70-100° C., then (ii) post-synthesis hydrothermal treatment of the as-synthesized silica mesophase in an aqueous emulsion of long chain N,N-dimethylalkylamine, typically at 120-130° C. for different periods of time. Depending on the conditions of both steps, materials with controlled pore sizes from 3.5 to 25 nm can be obtained. The pore volume varied accordingly from typically 0.7 to 3.6 cm$^3$/g, whereas the specific surface areas of 800-1500 m$^2$/g were not drastically affected (Kruk et al., 2000, 2002). The two occluded surfactants could be removed stepwise (Kruk et al., 2002, Sayari et al., 2005) or simultaneously, giving rise to PE-MCM-41 (material C in FIG. 1).

Diethanolamine (DEA) was used as exemplary amine, to remove $CO_2$. In addition to being a typical liquid-phase absorbent, DEA has a low vapour pressure making it less susceptible to volatilization than some other commonly used compounds. The PE-MCM-41, activated carbon, silica gel and conventional MCM-41 silica were compared for use as supports. Activated carbon and silica gel were chosen as supports since they are commonly used for various adsorption applications, and their surface properties are such that both are expected to retain DEA in their porous structure. Conventional MCM-41 silica was compared to PE-MCM-41 to study the effect of pore size expansion and enhanced pore volume.

Materials and Synthesis: Norit Darco KB-B activated carbon (particle size <150 μm), Davisil grade 643 silica gel (<150 μm), and zeolite 13X powder (~2 μm) were obtained from Sigma-Aldrich. The MCM-41 (~20 μm) and PE-MCM-41 (~20 μm) were synthesized using Cab-O-Sil M5 fumed silica (Cabot Corporation). All other chemicals were obtained from Sigma-Aldrich and used as supplied.

Impregnation of the supports with DEA was carried out by adding various amounts of the amine to distilled, de-ionized water, followed by addition of the desired amount of support and evaporating the solvent to dryness. Other samples were prepared using ethanol as the solvent. Drying was carried out in a vented oven at 60° C. The actual amount of DEA retained on the support was measured for each sample by decomposition in nitrogen using a TA Instruments Q500 Thermogravimetric Analyzer (TGA) coupled to a Pfeiffer Thermostar mass spectrometer (MS).

Nitrogen Adsorption Characterization: Nitrogen adsorption measurements were performed at 77 K using a Coulter Omnisorp 100 analyzer. Before exposure to nitrogen, the samples were heated to 100° C. under high vacuum. The specific surface area ($S_{BET}$) was determined from the linear part of the BET plot ($P/P_o$=0.05-0.15). The average pore size ($D_{KJS}$) for the MCM-41 materials was taken as the peak of the pore size distributions as calculated from the adsorption branch using the KJS method (Kruk et al., 1997). The total pore volume (V) was determined as the volume of liquid nitrogen adsorbed at a relative pressure of 0.995.

$CO_2$ Adsorption Studies: $CO_2$ adsorption uptake curves, uptake rate and $CO_2$ adsorption isotherms were obtained using the Q500 TGA-MS, and UHP gases supplied by Praxair. Samples of approximately 60 mg were loaded into the instrument and were heated, with $N_2$ purge, to remove pre-adsorbed moisture and $CO_2$. Examination of the data obtained with amine impregnated samples indicated that heating at 75° C. was sufficient to rapidly desorb any moisture and $CO_2$. Due to the strong adsorption of $H_2O$ on zeolite 13X, this material was initially heated to 400° C. for complete dehydration. Samples were then cooled to 25° C. and exposed to a dry mixture of $CO_2$ and nitrogen for a period of one hour, which was sufficient to reach equilibrium. The zeolite 13X samples were then regenerated by heating to 75° C. in dry nitrogen, and adsorption data were collected upon exposure to the same $CO_2/N_2$ mixture at 25° C. This was necessary to ensure that the amine impregnated samples and the 13X zeolite samples were compared after being activated at the same temperature, i.e., 75° C. The adsorption capacity was calculated based on the mass increase measured after one hour of exposure to the gas mixture. The uptake rates were calculated based on the maximum rate of mass gain after exposure to the gas mixture.

To obtain cyclic data, the samples were regenerated by rapid heating to 75° C. in dry nitrogen following the initial adsorption cycle. The samples were then allowed to cool to 25° C., and the adsorption-desorption cycle was repeated several times.

The effect of moisture on the uptake capacity was determined using the same initial treatment procedure and subsequently exposing the samples to humidified gases. This was achieved by passing the dry gases through a water containing gas saturator held at a constant temperature, then passing these humidified gases over the samples. A relative humidity of 28% at 25° C. was used during these tests to investigate the effects of moisture in the low humidity range, similar to the humidity of a gas stream that has been dehumidified through a condenser using cooling water at 4-6° C. To decouple the adsorption of moisture from the adsorption of $CO_2$, samples were first exposed to moist nitrogen until the water uptake ceased. Moist $CO_2$ was then passed over the samples for one hour to determine the $CO_2$ adsorption capacity.

Figure 2:
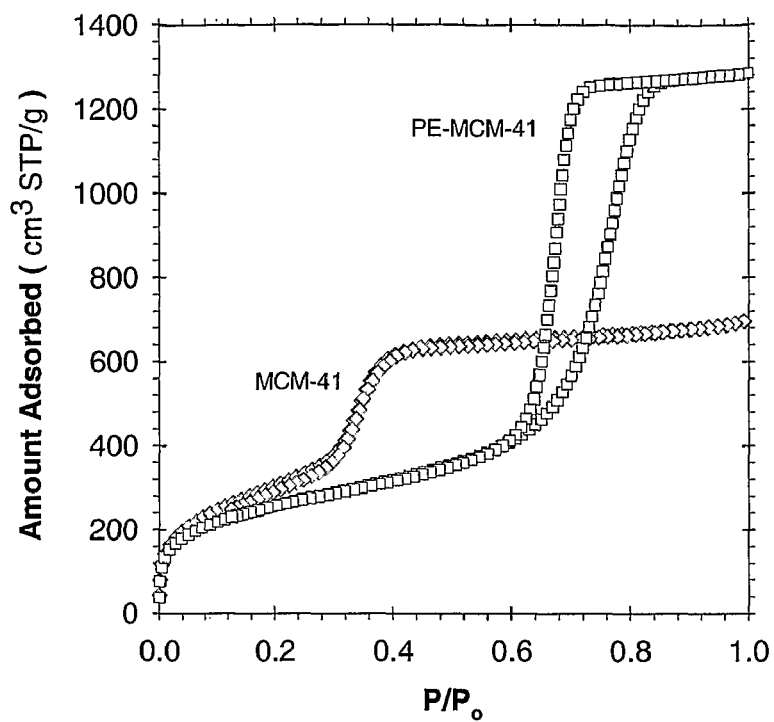
FIG. 2 depicts the nitrogen adsorption isotherms for MCM-41 and PE-MCM-41.
Figure 3:
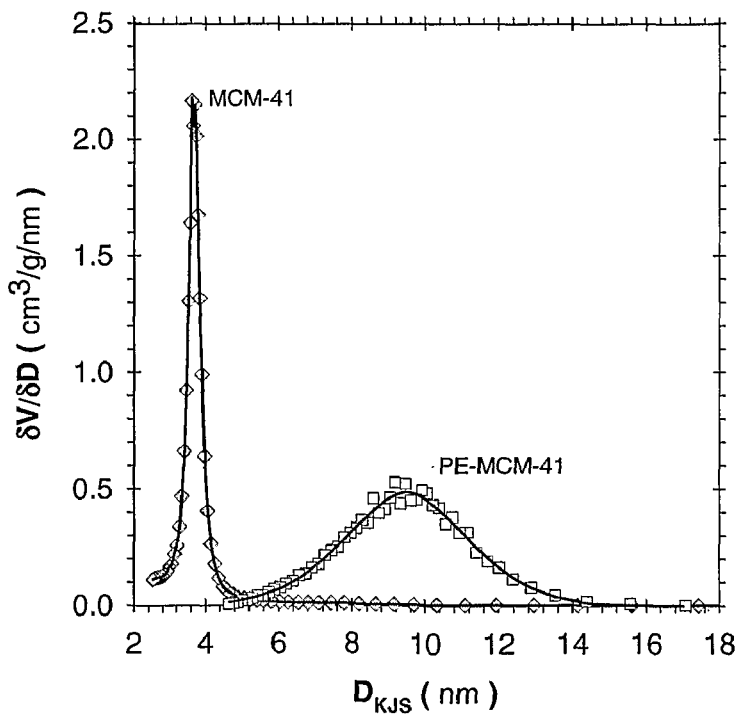
FIG. 3 is the KJS pore size distributions for MCM-41 and PE-MCM-41.

Comparison of the Supports: Nitrogen adsorption at 77 K was used to determine the structural characteristics of the supports. The nitrogen adsorption isotherms and calculated pore size distributions for MCM-41 and PE-MCM-41 are shown in FIG. 2 and FIG. 3. Based on the structural characteristics of the supports as presented in Table 1, the various materials were impregnated with DEA to pore saturation by the method previously described. Pore saturation was used since this was assumed to result in the largest quantity of DEA that could be retained by the supports. The samples were then tested for $CO_2$ adsorption capacity and uptake rate using a dry mixture of 5% $CO_2$ in nitrogen. These results are shown in Table 2. Although the uptake rates of the impregnated activated carbon and the silica gel were higher than those of the MCM-41 and PE-MCM-41 supported materials, PE-MCM-41 achieved the highest capacity since it was able to accommodate the largest quantity of amine. Examination of the carbon dioxide to amine ratios ($CO_2$/DEA) with respect to the specific surface area revealed that the $CO_2$/DEA ratio decreased as the surface area increased.

The use of PE-MCM-41 resulted in the highest adsorption capacity, and the second highest $CO_2$/DEA ratio. Further, with pore volumes of up to 3.6 cm$^3$/g attainable, (Kruk et al., 2000, 2002) PE-MCM-41 was the amine impregnated adsorbent chosen for further testing.

DEA Loading: The effect of amine loading on both the maximum adsorption rate and the $CO_2$ capacity was examined using the PE-MCM-41 support. Samples with amine loadings ranging from 0 to 5.14 $g_{DEA}/g_{sup}$ were prepared and tested for $CO_2$ adsorption capacity and rate using a dry mixture of 5% $CO_2$ in nitrogen. This gas mixture was chosen for the bulk of the adsorption tests because it was expected that the amine impregnated adsorbent would have a high capacity for $CO_2$ even in the low partial pressure region. Since $CO_2$ reacts chemically with the amine, higher partial pressures of $CO_2$ would not greatly increase the $CO_2$ adsorption capacity.

Figure 4:
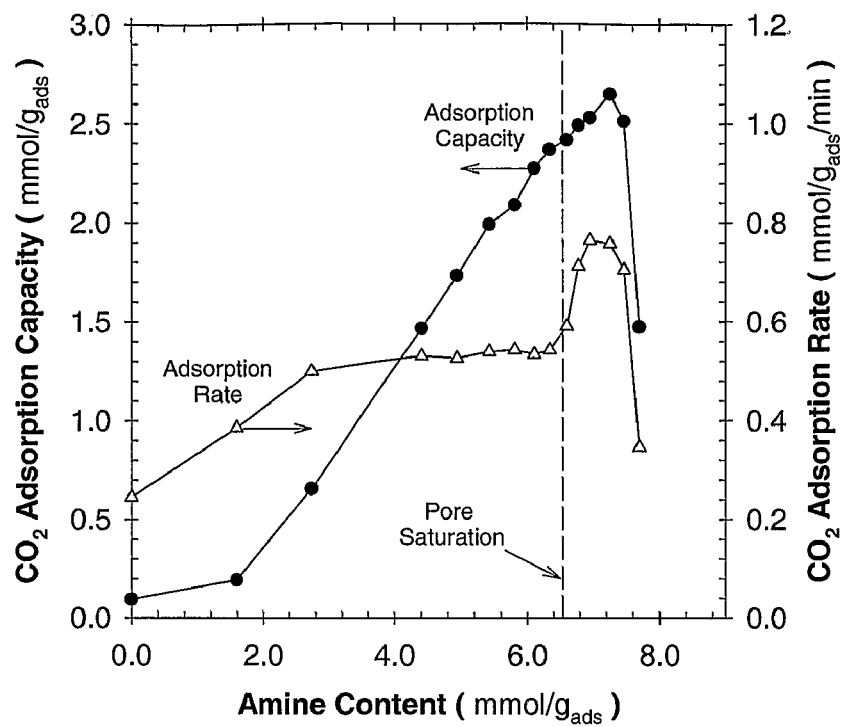
FIG. 4 is a plot of $CO_2$ adsorption capacity and adsorption rate as a function of DEA content in PE-MCM-41 obtained with dry 5% $CO_2$ in $N_2$.

As shown in FIG. 4, a maximum capacity of 2.65 mmol $(CO_2)/g_{ads}$ was obtained at an amine content of 7.26 mmol $(DEA)/g_{ads}$. Higher amine contents resulted in lower $CO_2$ capacities as measured after one hour. The uptake curves of these highly loaded samples showed a high degree of tailing, but for the sake of consistency, the capacity of all samples was compared after one hour on stream. The tailing in the uptake curves for these samples indicated that beyond an amine loading corresponding to pore saturation, the additional DEA was deposited on the adsorbent external surface as well as in the inter-particle voids. With large excesses of DEA, film diffusional resistance became a limiting factor for the kinetics of $CO_2$ uptake, causing the tailing in the uptake curves. This contention was supported by observations of the texture of the impregnated materials, which changed gradually from a free-flowing powder to an agglomerated powder as the amine loading exceeded pore saturation.

The $CO_2$ uptake rate increased initially and reached a steady value of approximately 0.55 mmol$(CO_2)/g_{ads}$/min between amine contents of 2.74 and 6.34 mmol$(DEA)/g_{ads}$. After exceeding the pore saturation point of 6.54 mmol $(DEA)/g_{ads}$, the uptake rate abruptly increased, reaching a maximum of approximately 0.76 mmol/$g_{ads}$/min at an amine content of 6.95 mmol$(DEA)/g_{ads}$. This sharp increase was attributed to the increase in external deposition of DEA, which initially caused an increase in the adsorption rate due to the easily accessible DEA on the surface and in the inter-particle voids of the adsorbent particles. As the DEA content increased further, the adsorption rate decreased due to the resulting mass transfer limitations, mainly within the developed external film.

Figure 5:
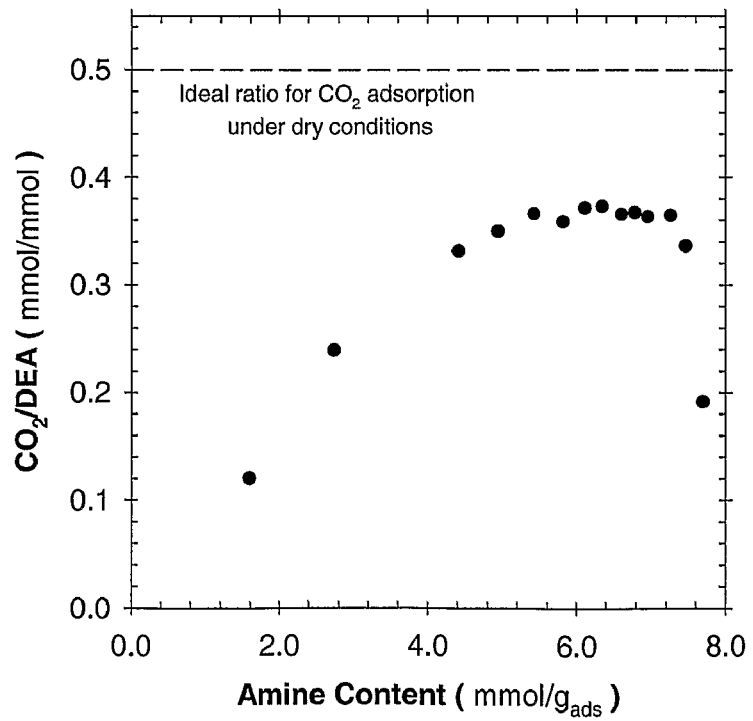
FIG. 5 is a plot of the calculated $CO_2$/DEA ratios for the DEA impregnated PE-MCM-41.
Figure 6:
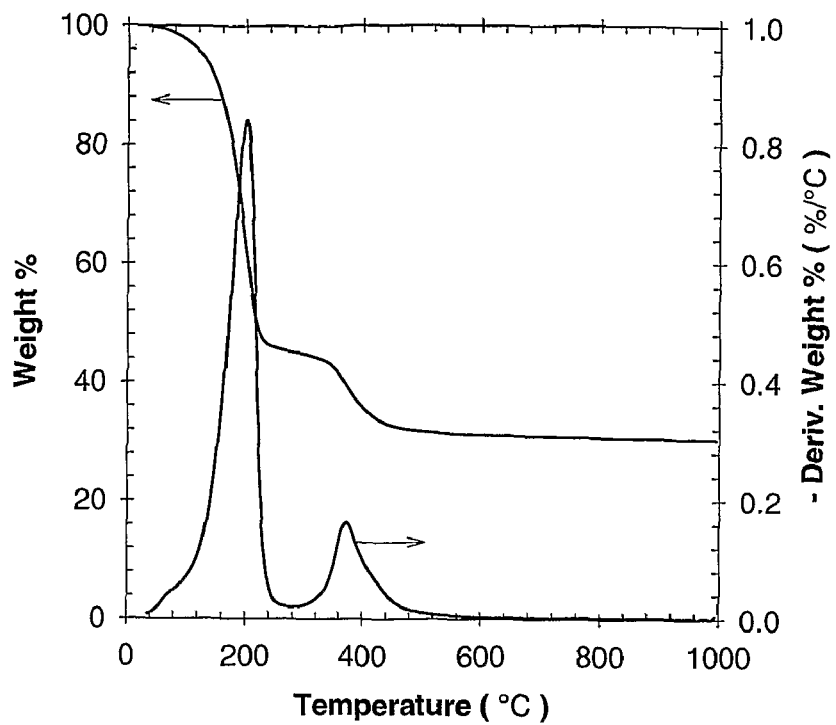
FIG. 6 is a graph of the decomposition profile for DEA impregnated PE-MCM-41 (6.34 mmol DEA/$g_{ads}$) with a temperature ramp of 10° C./min dry $N_2$.

FIG. 5 shows the calculated $CO_2$/DEA ratios for the DEA impregnated PE-MCM-41. As discussed in the literature (Rinker et al., 2000; Satyapal et al., 2001; Huang et al., 2003) in the absence of moisture, DEA and other secondary amines should react with $CO_2$ in the stoichiometric ratio of 0.5 moles of $CO_2$ per mole of amine. The current study showed that a maximum ratio of 0.37 mol$(CO_2)$/mol$(DEA)$ was obtained, which was fairly constant for amine contents between 5 and 7 mmol$(DEA)/g_{ads}$. A possible cause for the low $CO_2$/DEA ratios was revealed by analyzing the TGA decomposition profiles, an example of which is shown in FIG. 6. The profile was obtained under flowing nitrogen using a thermal ramp of 10° C./min for a sample impregnated with 6.34 mmol$(DEA)/g_{ads}$. The data revealed that a portion of the DEA loss (5.0 mmol$(DEA)/g_{ads}$) occurred at temperatures below 280° C., while another portion (1.34 mmol$(DEA)/g_{ads}$) took place above 300° C. This second loss, occurring at relatively high temperatures, indicated strong interaction forces between DEA and the support. Even though a portion of the impregnated DEA was not active, the resulting $CO_2$-amine chemistry exhibited excellent efficiency ($CO_2$/DEA=0.37) in comparison to typical liquid phase amine scrubbing ($CO_2$/DEA=0.20-0.25) when exposed to mild (atmospheric) pressure conditions.

Impregnation Solvent Effects: It was noticed that samples with very high loadings required a considerably longer time to evaporate the water used during the impregnation procedure. To decrease the time required to dry the material, the solvent was changed from water to ethanol, resulting in a reduction in drying time by a factor of four. As shown in Table 3, in addition to the reduction in drying time, the amount of DEA retained on the support increased slightly (ca. 1%), whereas the $CO_2$ adsorption capacity of the impregnated material increased significantly (ca. 10%). This was accompanied by a noticeable increase in the $CO_2$/DEA ratio, suggesting that the use of ethanol as a solvent resulted in a larger fraction of amine being available for $CO_2$ adsorption.

Due to the improved performance obtained using ethanol during impregnation, this solvent was used for the preparation of samples for further studies. Based on the adsorption capacity, uptake rate, $CO_2$/DEA ratio, and physical texture of the samples impregnated with ethanol as the solvent, it was found that the optimum combination of these parameters was obtained with the sample loaded at a ratio of 3 $g_{DEA}/g_{sup}$. This resulted in a sample with an amine content of 6.98 mmol $(DEA)/g_{ads}$ (6.98 DEA-PE-MCM-41), approximately 33% higher than pore saturation, on a support only basis. This DEA imprenated material was used for a comparative study with zeolite 13X.

Figure 7:
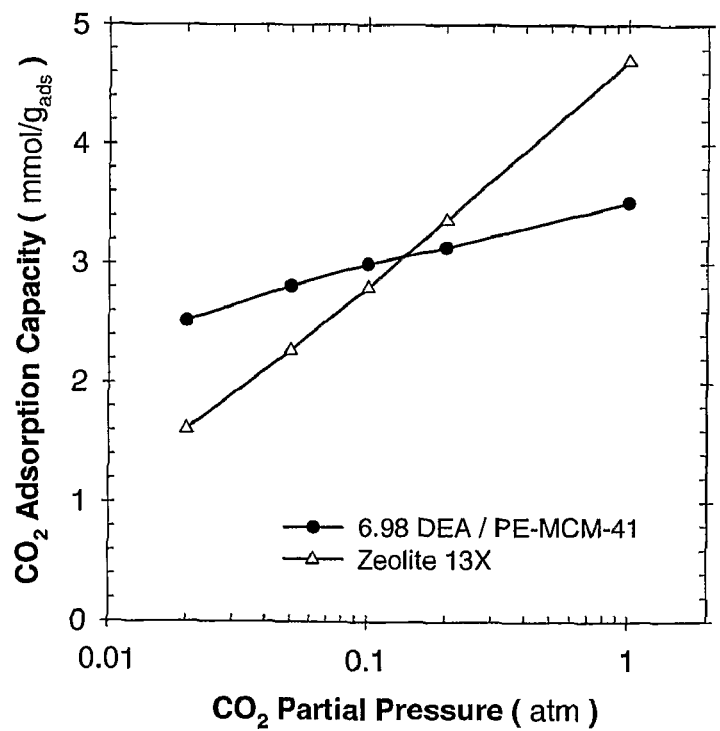
FIG. 7 is a $CO_2$ adsorption isotherm for sample 6.89 DEA-PE-MCM-41 and zeolite 13X.

$CO_2$ adsorption comparison between amine loaded PE-MCM-41 and zeolite 13X: The $CO_2$ adsorption isotherms were obtained gravimetrically for sample 6.98 DEA-PE-MCM-41 and zeolite 13X at 25° C. The standard adsorption test method described earlier was used with various concentrations of $CO_2$ in nitrogen. The resulting isotherm data is shown in FIG. 7. This study indicated that under dry conditions, the amine impregnated material exhibited the most promising potential for applications in the low $CO_2$ partial pressure region since it has superior adsorption capacity compared to zeolite 13X. The isotherm data suggested that the two materials should have similar $CO_2$ adsorption capacity in the region of 0.15 atm $CO_2$, beyond which point, zeolite 13X showed higher equilibrium capacity than the amine impregnated PE-MCM-41 material. This behaviour is the result of the strong chemisorptive interaction between DEA and $CO_2$ molecules even at very low partial pressures. This type of adsorption does not occur with zeolite 13X since $CO_2$ molecules are known to be largely physisorbed to its surface through electrostatic interactions. As the partial pressure of $CO_2$ increased, the $CO_2$ capacity of the amine impregnated material was limited by stoichiometry as discussed earlier, hence only marginal increases in $CO_2$ adsorption occurred for a large increase in $CO_2$ partial pressure in a dry atmosphere.

Figure 8:
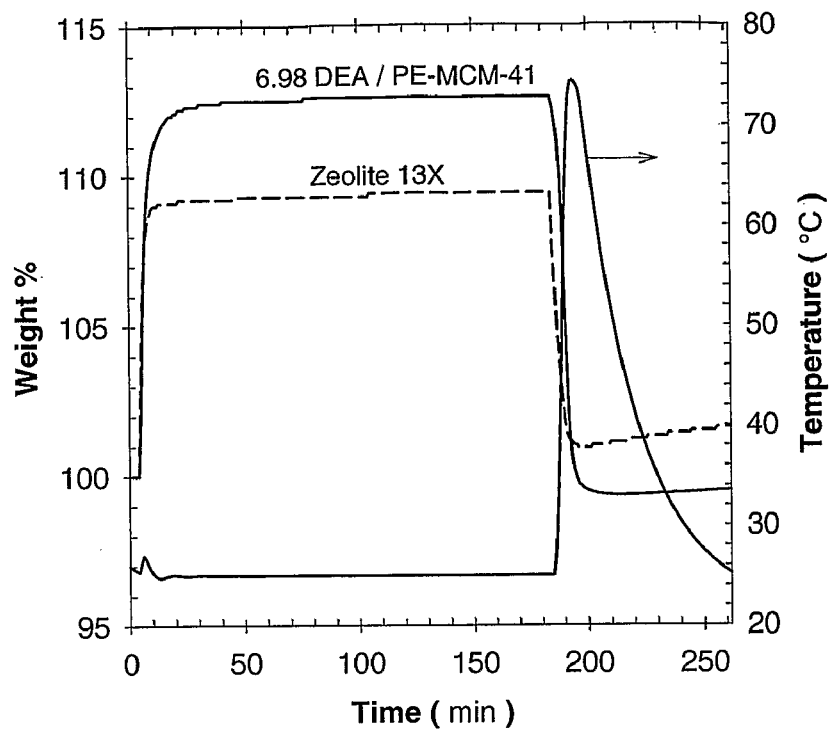
FIG. 8 is an adsorption-desorption profile obtained with dry 5% $CO_2$ in $N_2$ for 6.98 DEA-PE-MCM-41 and zeolite 13X.

In addition to high adsorption capacity, any material employed industrially must exhibit favourable kinetics to decrease the length of unused bed in the adsorption column, and thus shorten the mass transfer zone. FIG. 8 shows the adsorption profiles obtained with the dry mixture of 5% $CO_2$ in nitrogen at 25° C. and the desorption profiles obtained with dry nitrogen at 75° C. for both 6.98 DEA-PE-MCM-41 and zeolite 13X. The two materials showed similar favourable adsorption kinetics since 95% of the equilibrium capacity was reached within 6 minutes (zeolite 13X) and 12 minutes (6.98 DEA-PE-MCM-41) of exposure to the $CO_2/N_2$ gas mixture. Upon heating to 75° C. in nitrogen, the amine impregnated material quickly desorbed all the $CO_2$, whereas zeolite 13X showed evidence of incomplete desorption. In an industrial setting, incomplete desorption would reduce the working capacity of the adsorption bed, resulting in reduced throughput. According to these results, the DEA impregnated material should allow for more efficient use of the length of an adsorption bed when employed at the industrial scale. Further, the thermal treatment required for desorption consisted only of a heat pulse sufficient to reach 75° C. Under these conditions, the desorption dynamics and energy requirements favour the amine impregnated material in comparison to zeolite 13X. These attributes may result in lower operational costs and increased amounts of processed gas.

Since $CO_2$ is frequently found in gas streams containing varying amounts of water vapour, a highly desirable characteristic of a $CO_2$ adsorbent is tolerance to moisture. Although zeolite 13X has a high capacity for $CO_2$ under dry conditions, it cannot tolerate moisture, and requires regeneration at high temperatures after exposure to water vapour. According to the literature (Rinker et al., 2000; Satyapal et al., 2001; Huang et al., 2003), moisture should actually increase the $CO_2$ capacity of the amine impregnated material by allowing the formation of bicarbonate ions instead of carbamate ions, resulting in a doubling of the $CO_2$/DEA stoichiometric ratio. The effect of moisture on both of these materials was examined, as described earlier, by exposing the activated samples to a moist stream of nitrogen (28% relative humidity at 25° C.). Once the uptake of moisture ceased, the samples were exposed to a stream of 5% $CO_2$ in nitrogen under the same humidity conditions. Sample 6.98 DEA-PE-MCM-41 adsorbed 5.37 mmol $(H_2O)/g_{ads}$, and was still capable of adsorbing 2.85 mmol $(CO_2)/g_{ads}$. Zeolite 13X adsorbed 15.11 mmol$(H_2O)/g_{ads}$, but could subsequently only adsorb 0.09 mmol$(CO_2)/g_{ads}$. Although the presence of moisture did not significantly enhance the performance of the amine impregnated material, the results showed that this material drastically outperformed zeolite 13X under the humidity conditions of the current study. This suggested that gas streams to be treated with DEA loaded PE-MCM-41 would not require any stringent moisture control, whereas extensive drying is necessary in the case of zeolite 13X.

Figure 9:
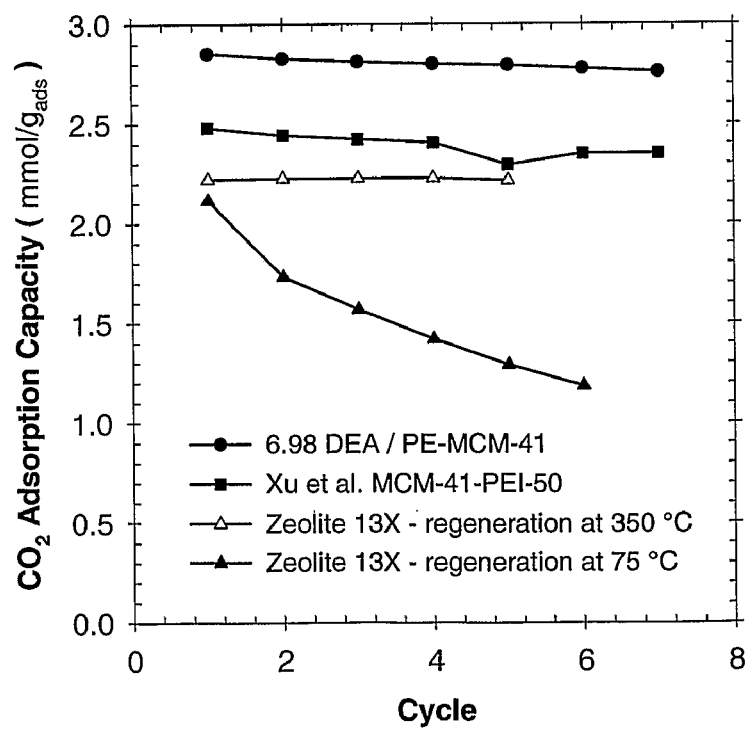
FIG. 9 is a plot of $CO_2$ adsorption capacity as a function of adsorption cycle for 6.98 DEA-PE-MCM-41 and other $CO_2$ adsorbents.

Cyclic performance: In order for an adsorbent to be employed industrially, it should provide long term, stable performance. The cyclic adsorption performance of 6.98 DEA-PE-MCM-41 was examined, and the results are shown in FIG. 9 along with results obtained using zeolite 13X and others obtained by Xu et al. (2002, 2003) for polyethylenimine (PEI) impregnated MCM-41.

Examination of FIG. 9 reveals that the DEA impregnated adsorbent has only a minor decrease in adsorption capacity (0.09 mmol$(CO_2)/g_{ads}$, i.e., 3.3% of initial capacity) after seven adsorption-desorption cycles. The loss in capacity is believed to be due to a slow loss of DEA, which appeared in the TGA data as a loss in adsorbent mass over time. The presence of DEA however could not be detected by the mass spectrometer. According to the work of Satyapal et al., (2001) the addition of polyethylene glycol (PEG) to their polymethyl methacrylate supported polyethylenimine $CO_2$ adsorbent (known as HSC+) resulted in improved thermal stability.

Xu et al. (2002, 2003) reported cyclic performance data for standard MCM-41 impregnated with 50 wt % polyethylenimine (MCM-41-PEI-50). The results were obtained using pure $CO_2$ and operating between temperatures of 75° C.-100° C. The reported results show a slight decrease in capacity (0.13 mmol$(CO_2)/g_{ads}$ after seven cycles, i.e., 5.3% of initial capacity) similar to the decrease obtained in the current study for the DEA impregnated PE-MCM-41.

Under high temperature regeneration conditions (350° C.), the cyclic performance of zeolite 13X is stable with virtually no decrease in adsorption capacity occurring. The adsorption capacity decreases very quickly (0.93 mmol$(CO_2)/g_{ads}$ after six cycles, i.e., 44.1% of initial capacity) when the milder regeneration temperature of 75° C. is used. The TGA-MS data suggested that the loss in capacity was due to the incomplete regeneration of the zeolite leading to the accumulation of $CO_2$, $N_2$, and eventually of water impurities, the latter due to trace moisture in the gas streams. The original adsorption capacity could be obtained after exposing the material to the high temperature regeneration conditions. These results illustrate both the need for higher temperature regeneration conditions and the importance of moisture control of the inlet gas when using zeolite 13X to remove $CO_2$, two major disadvantages that do not occur with the adsorbent disclosed in the present invention.

TABLE 2

Structural Properties of the Supports

| support | $S_{BET}$ (m$^2$/g) | $D_{KJS}$ (nm) | V (cm$^3$/g) |
|---|---|---|---|
| activated carbon[a] | 1640 | — | 1.48 |
| silica gel[b] | 256 | — | 0.94 |
| MCM-41 | 1138 | 3.6 | 1.03 |
| PE-MCM-41 | 917 | 9.7 | 2.03 |

[a]Norit Darco KB-B,
[b]Davisil Grade 643.

TABLE 3

$CO_2$ Adsorption Data[a] for DEA Loaded Materials

| support | amine loading ratio[b] (g/g$_{sup}$) | amine content[c] (mmol/g$_{ads}$) | $CO_2$ capacity (mmol/g$_{ads}$) | $CO_2$ uptake rate (mmol/g$_{ads}$/min) | $CO_2$/DEA ratio (mol/mol) |
|---|---|---|---|---|---|
| activated carbon[d] | 1.62 | 5.41 | 1.51 | 0.95 | 0.28 |
| silica gel[e] | 1.03 | 4.61 | 1.88 | 0.69 | 0.41 |
| MCM-41 | 1.13 | 4.49 | 1.26 | 0.57 | 0.28 |
| PE-MCM-41 | 2.22 | 6.34 | 2.36 | 0.54 | 0.37 |

[a]Obtained with dry 5% $CO_2$ in $N_2$,
[b]g$_{sup}$ = gram of support,
[c]g$_{ads}$ = gram of adsorbent,
[d]Norit Darco KB-B,
[e]Davisil Grade 643.

TABLE 4

Comparison of DEA Impregnated PE-MCM-41 Using Water or Ethanol as the Impregnation Solvent.

| solvent | nominal loading ratio[a] (gDEA/g$_{sup}$) | amine content (mmol/g$_{ads}$) | $CO_2$ adsorption capacity[b] (mmol/g$_{ads}$) | $CO_2$/DEA ratio (mmol/mmol) |
|---|---|---|---|---|
| water | 2.22 | 6.34 | 2.36 | 0.37 |
| ethanol | 2.25 | 6.42 | 2.54 | 0.40 |
| water | 2.50 | 6.60 | 2.41 | 0.37 |
| ethanol | 2.50 | 6.68 | 2.64 | 0.40 |

TABLE 4-continued

Comparison of DEA Impregnated PE-MCM-41 Using Water or Ethanol as the Impregnation Solvent.

| solvent | nominal loading ratio[a] (gDEA/g$_{sup}$) | amine content (mmol/g$_{ads}$) | $CO_2$ adsorption capacity[b] (mmol/g$_{ads}$) | $CO_2$/DEA ratio (mmol/mmol) |
|---|---|---|---|---|
| water | 2.75 | 6.78 | 2.49 | 0.37 |
| ethanol | 2.72 | 6.84 | 2.74 | 0.40 |
| water | 2.99 | 6.95 | 2.53 | 0.36 |
| ethanol | 3.00 | 6.98 | 2.81 | 0.40 |
| water | 3.51 | 7.26 | 2.65 | 0.37 |
| ethanol | 3.48 | 7.31 | 2.93 | 0.40 |
| water | 4.13 | 7.47 | 2.51 | 0.34 |
| ethanol | 3.98 | 7.54 | 2.76 | 0.37 |

[a]Based on amount of DEA added during impregnation procedure,
[b]Obtained with dry 5% $CO_2$ in $N_2$.

Example 2

Adsorbent Prepared via Post Synthesis Grafting: Enhancement Effect of Using Pore Expanded MCM-41: The MCM-41 and pore-expanded MCM-41 (PE-MCM-41) materials were prepared according to the methods previously described. All materials were calcinated in flowing $N_2$ under a thermal ramp rate of 1° C./min to 550° C., and then held in air for 5.0 hours. The materials were then transferred, hot, to a sealed container until their use. A brief summary of the material characteristics, as obtained by $N_2$ adsorption (77 K) are given in Table 2.

For all the grafted materials, the reagents were all purchased from Sigma-Aldrich and used as supplied with no further treatment. The following lists the compounds that were used with their respective purities and the acronym applied for identification in this study, toluene (99% ACS grade), pentane (99% ACS Grade), and 3-[2-(2-aminoethylamino)ethylamino]propyl-trimethoxysilane, (Tech) herein referred to as TRI.

In order to introduce the amine functionality to the MCM-41 materials, the conventional grafting technique was employed. Specifically, a suspension 1.0 g (previously dehydrated at 150° C. for 2 hours) of the support material in 150 cc of toluene (250 cc multi-neck flask) at room temperature was established, then a quantity of the amine based silane was added and the temperature was increased rapidly to 110° C., where it was held for 16 hours under reflux. These grafted materials were then filtered in a Büschner funnel with copious amounts of toluene and then pentane. The materials were then dried at 120° C. in a natural convection oven for 4 hours and subsequently stored in capped vials until use.

The amount of amine grafted was determined by a thermal decomposition method using the TGA-MS. From MS profiles obtained from a fresh material decomposition, it was determined that not of all alkoxy groups were hydrolyzed leading to surface Si—O—Si bridges, and therefore, determination of the amount of grafted amine is not straightforward via simple TGA analysis. From a set of exploratory experiments, it was determined that the unbound methoxy ligands were removed up to a temperature of 200° C., thereafter a second decomposition product, caused by the decomposition of the amine chain, started to evolve. Thus the amount of grafted amine should correspond to the total weight loss beyond 200° C. To correctly determine this amount, the material was first treated in a flow of UHP He at 200° C. for a period of 1 hour. At the completion of this initial heat treatment, a thermal ramp of 10° C./min in UHP He was imposed, up to 900° C., then in air up to 1000° C. to remove any residual coke from the support material. In order to validate this approach, a few samples were also examined by elemental analysis using a Carlo Erba EA1100 CHNS instrument. By comparing these results with those obtained by the TGA-MS analysis, the TGA-MS results were found to be no more than 2-5% lower (on a dry basis) relative to the amount determined by elemental analysis.

Material Adsorption Characteristics: In order to determine the adsorption capacity, a modified thermal gravimetric balance (Q500-TGA, TA Instruments) coupled to a 1-300 AMU mass-spectrometer (Thermostar, Pfieffer Vacuum) was employed. Using this balance the material's response to a step change in $CO_2$ concentration (from 0.0 to 5% in $N_2$) was measured, as the weight change relative to the condition of the material after thermal regeneration with purge. The regeneration condition imposed on the materials was determined by a thermal stability study in a $N_2$ atmosphere ramped at 25° C./min to 1000° C. with the previously mentioned TGA-MS. All the pure gases used in this study were purchased from Praxair Canada, and were specified as UHP grade. The 5% $CO_2/N_2$ mixture was also purchased from Praxair Canada as a certified UHP grade mixture. The feed flowrates were controlled at 150 sccm sample and 10 sccm balance purge.

In order to examine the effects of moisture on the adsorption capacity of $CO_2$ with these grafted materials, the following procedure was employed, where the term humid refers to 5° C. saturation of water with the carrier gas (26% relative humidity (RH) @ 25° C.):

1)—Initial thermal activation under dry $N_2$ purge (200° C., 45 minutes)
2)—Isothermal (25° C.) humid $N_2$ adsorption to equilibrium
3)—Isothermal (25° C.) humid 5% $CO_2/N_2$ adsorption to equilibrium
4)—Thermal regeneration in humid $N_2$ to 100° C. for 30 minutes The procedure for dry $CO_2$ adsorption was similar; with the removal of humidity from all the streams and step 2 omitted.

The regeneration temperature of 100° C. was determined from a TGA profile of a fresh material which was subsequently loaded with 5% $CO_2/N_2$, and thermally ramped (10° C./min) up to 200° C. in order to determine the optimal $CO_2$ release temperature.

Figure 10:
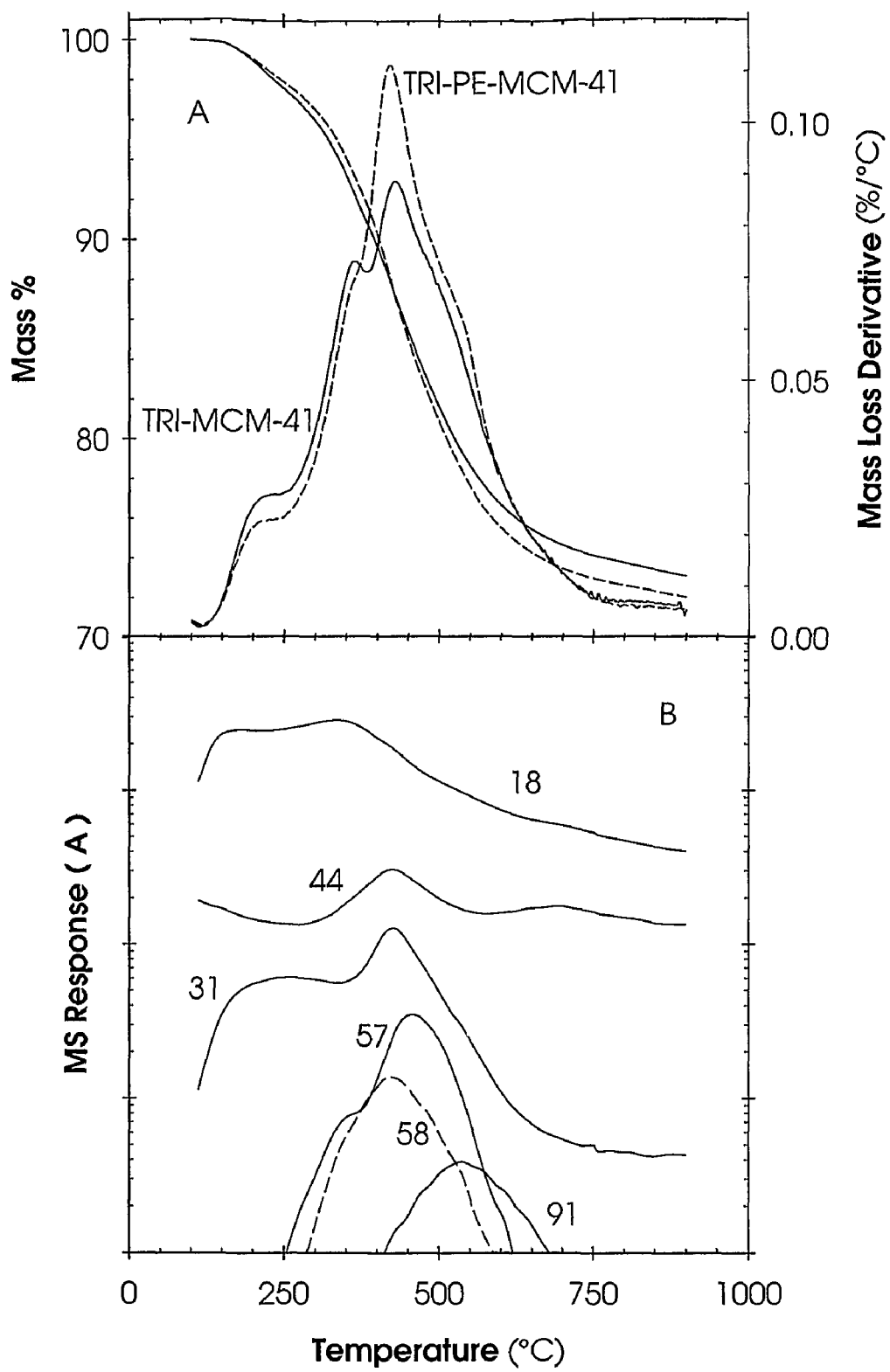
FIG. 10 shows the TGA decomposition profiles for MCM-41 and PE-MCM-41 functionalized with triamine-silane using the conventional dry technique.

Thermal stability: The thermal stability of the grafted TRI-PE-MCM-41 and TRI-MCM-41 materials was examined in order to determine the upper thermal limit without sacrificing the amine content. The results for TRI-MCM-41 and the TRI-PE-MCM-41 with a 25° C./min thermal ramp in dry $N_2$ is shown FIG. 10A for the weight loss and derivative responses and in FIG. 10B for the corresponding mass spectrometry profiles of select AMU/e values as a function of time for the TRI-MCM-41 support only; the TRI-PE-MCM-41 material exhibited similar trends.

From the data shown in the TG-DTGA plot, both grafted supports exhibited similar weight losses as a function of temperature. In combination with the MS data shown in FIG. 10B, the various weight loss contributions can be determined. First, at temperatures below 250° C., the MS profiles show that the dominant species evolving are water and methanol. This combination supports the fact that not all methoxy groups are hydrolysed, and thus some are left un-reacted. When the methoxy groups react, they most likely react with adjacent free hydroxyl groups and therefore produce $H_2O$ and $CH_3OH$, as shown in the MS profile, FIG. 10B as 18 and 31 respectively. Above 250° C., the amine chain starts to decompose and is removed from the surface in three stages. The first stage occurs in the temperature range of 250-400° C., where a slow decomposition of the amine chain occurs, and the release of carbon dioxide formed by the formation of carbonate, and/or bicarbonate. It is this high energy requirement which limits the efficiency of the amine chain to adsorb $CO_2$, since the release of the $CO_2$ can only coincide with the decomposition of the amine chain. At temperatures above 400° C. the decomposition rate of the amine chain increases and is complete by 650° C. For temperatures above 650° C., coke deposit formation is slowly burnt off, due to the trace amounts of oxygen which leak into the system. This partial coke burn-off is shown by the increase in the MS profile of amu/e 44 and 18, which represent $CO_2$ and $H_2O$ respectively. Overall, the grafted amine species appears to be stable up to temperatures of 250° C., in a nitrogen atmosphere.

Figure 11:
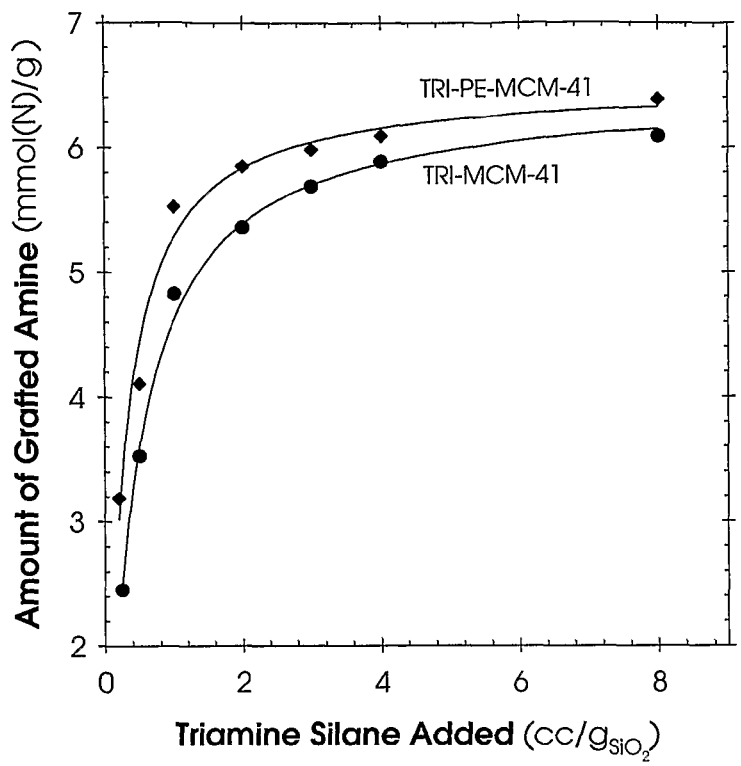
FIG. 11 shows the amount of triamine-silane grafted as a function of the amount of silane added for the MCM-41 and PE-MCM-41 supports.

Amount of Amino-Silane Grafted: The optimization of the material for $CO_2$ adsorption capacity involved multiple criteria. These included, minimization of the amine addition, and maximization of the apparent adsorption rate and adsorption capacity. To explore these parameters and their effect on the amount of amino-silane grafted and the $CO_2$ adsorption capacity, samples were prepared with various quantities of the amino-silane added to the reaction mixture. These results are shown in FIG. 11 for both the MCM-41 and PE-MCM-41 support materials. From these data it is evident that the amount of grafted silane follows a Langmuir uptake curve, shown as the solid curves, Eq. 1, $$n = \frac{n_\infty bV}{1 + bV} \quad (1)$$

where n represents the amount of nitrogen grafted (mmol(N)/g), V represents the amount of silane added (cc/g $SiO_2$), $n_\infty$ is the limiting amount reacted (mmol(N)/g), and b is the Langmuir affinity constant (g/cc).

It is interesting to note that in comparison to the MCM-41 support, the PE-MCM-41 support resulted with a higher quantity of triamine-silane grafted for the same amount of silane added. Since the surface area of the two supports are similar, this result may be due to the quantity of reactive hydroxyl groups present or the effect of the pore-size and pore volume on the rate of the surface reaction.

$CO_2$ Equilibrium Adsorption Performance: In terms of adsorption performance, the various supports were challenged with a 5% $CO_2/N_2$ mixture in order to determine the adsorption capacity and adsorption rate. By examining the adsorption capacity and rate in relation to the amount of added silane, and the amount of silane grafted, the optimal material could be determined, as synthesized under the conditions imposed in this study. The results are shown as function of the amount of silane added in FIG. 12 and the amount of grafted silane in FIG. 13.

Figure 12:
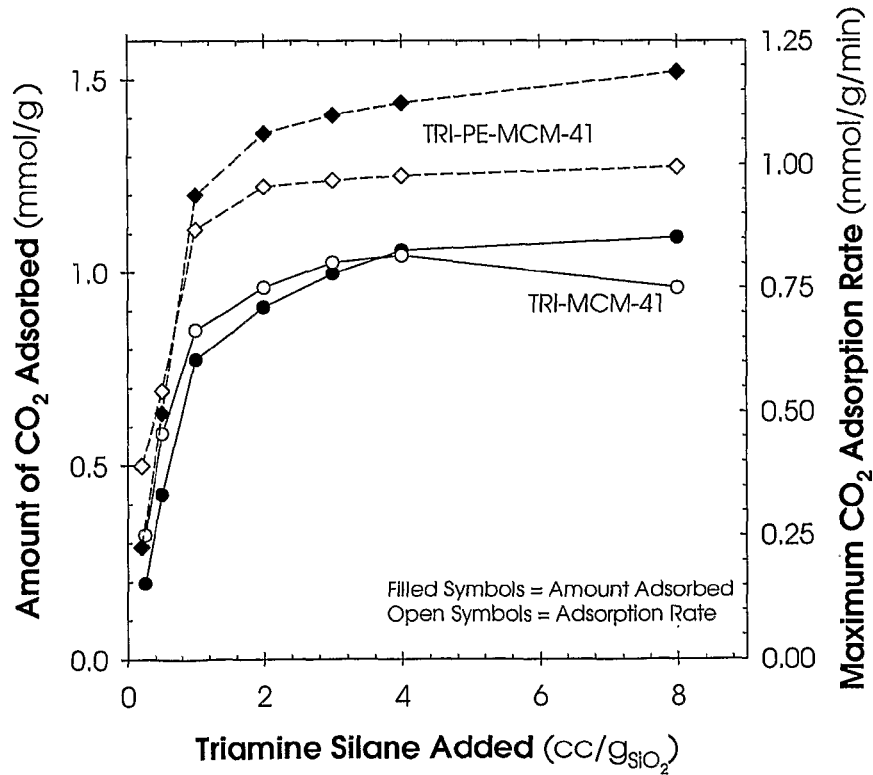
FIG. 12 shows the 5% $CO_2$ adsorption capacity and maximum adsorption rate as a function of the amount of triamine-silane added for the MCM-41 and PE-MCM-41 supports.

From FIG. 12, the TRI-PE-MCM-41 material exhibited much higher adsorption capacities and apparent rates, than those exhibited by the TRI-MCM-41 material. Most importantly, the TRI-MCM-41 material exhibited a drop in the apparent adsorption rate as the amount of silane added was increased above 4 cc/g. The TRI-PE-MCM-41 material did not show any decrease in the adsorption rate or the adsorption capacity. Therefore, it can be concluded, that at high triamine-silane loading the surface density may affect the rate of adsorption, due to the crowding of the pore itself. It can be inferred from this data that the drop is not due to pore blockage, since the adsorption capacity continued to increase. These effects were not observed with the TRI-PE-MCM-41 material; rather a rate plateau was reached. While not wishing to be bound by theory, this plateau seems to relate to the mobility of the $CO_2$ within the pore system, it may be caused by the openness of the pore itself. Since the amine group is small in comparison to the pore diameter, and the diffusing compound, $CO_2$, is also very small, this limitation may be caused by the molecular diffusivity of $CO_2$ within the pore.

Figure 13:
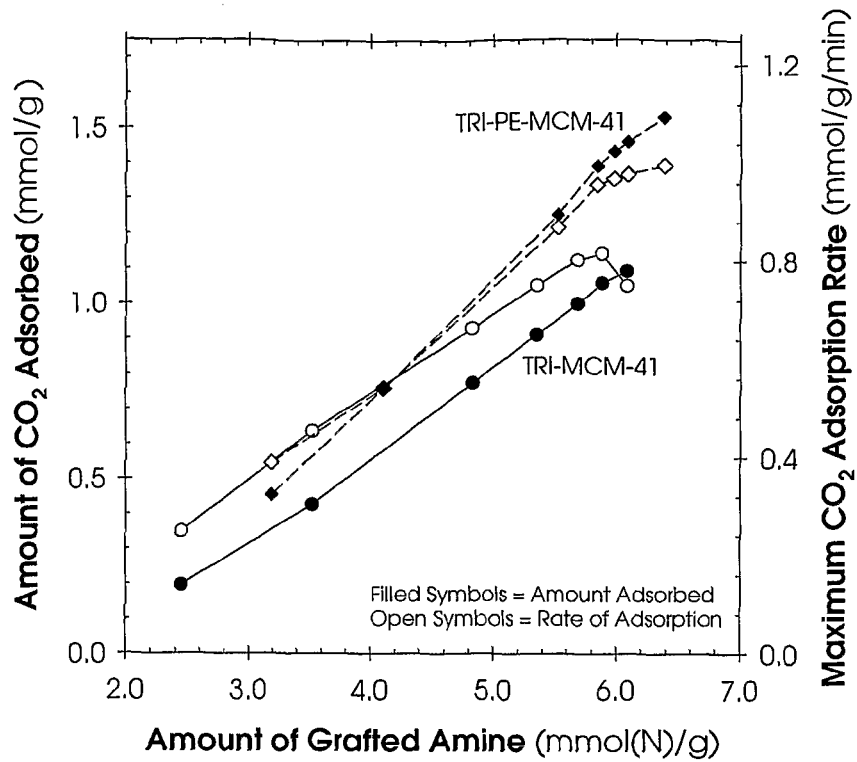
FIG. 13 represents the amount of $CO_2$ adsorbed and maximum adsorption rate as a function of the amount of triamine grafted for the MCM-41 and PE-MCM-41 supports.

When the adsorption performance data is compared on the basis of the amount of grafted amine, similar trends are observed, as shown in FIG. 13. In this plot, the amount of grafted amine is expressed as the amount of grafted nitrogen per gram of total material (support+amine). From this data, it is apparent that the PE-MCM-41 support material allows for larger amounts of amine to be grafted without negative performance effects.

Figure 14:
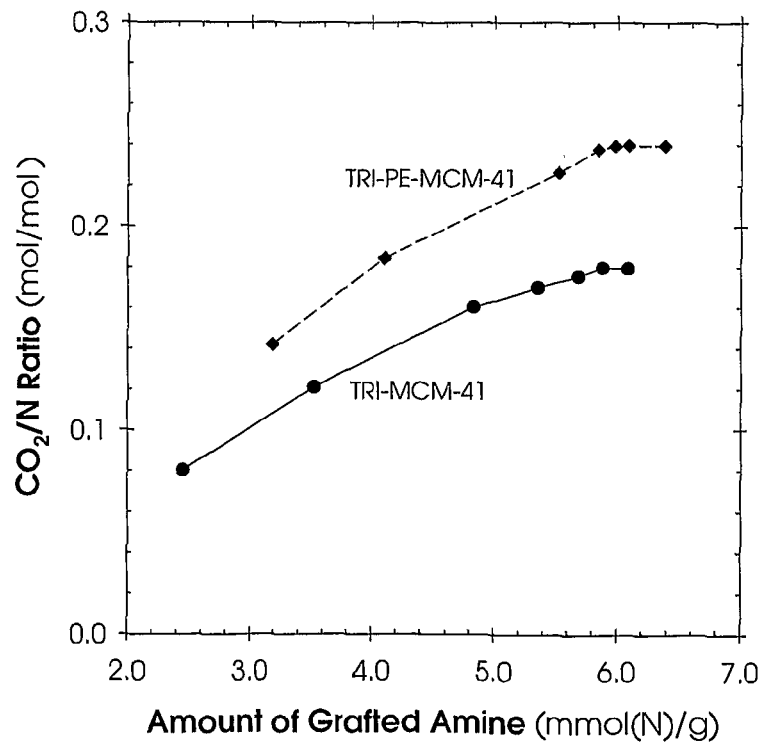
FIG. 14 is a plot of the $CO_2$/N ratio, for 5% $CO_2/N_2$ adsorption as a function of the amount of triamine grafted for the MCM-41 and PE-MCM-41 supports.

The adsorption data was also examined in terms of the amine efficiency, i.e., moles of $CO_2$ adsorbed per moles of amine present, the $CO_2/N$ ratio, and is shown in FIG. 14. Under the assumption of carbamate formation, this ratio should be 0.5 for dry $CO_2$ adsorption, and should approach 1.0 for wet $CO_2$ adsorption, due the formation of carbonate and bicarbonate. The actual $CO_2/N$ ratios obtained under dry conditions (FIG. 14) are significantly below 0.5. This is potentially attributable, in part, to the fact that the reaction is weakly sensitive to the partial pressure of $CO_2$ (in this study, low partial pressure $CO_2$ (5.1 kPa) was used). Further, the amine-$CO_2$ chemistry may be hindered by the possible presence of amine hydrogen bonding, leading to a reduction in amine groups available for $CO_2$ adsorption. However, the TRI-PE-MCM-41 materials exhibited higher $CO_2/N$ ratios than the TRI-MCM-41 materials. While not wishing to be bound by theory, this is most likely due to the increased pore volume and pore diameter, which could lead to the amine chain conforming in such a way as to interact with the surface via the amine functional group.

Figure 15:
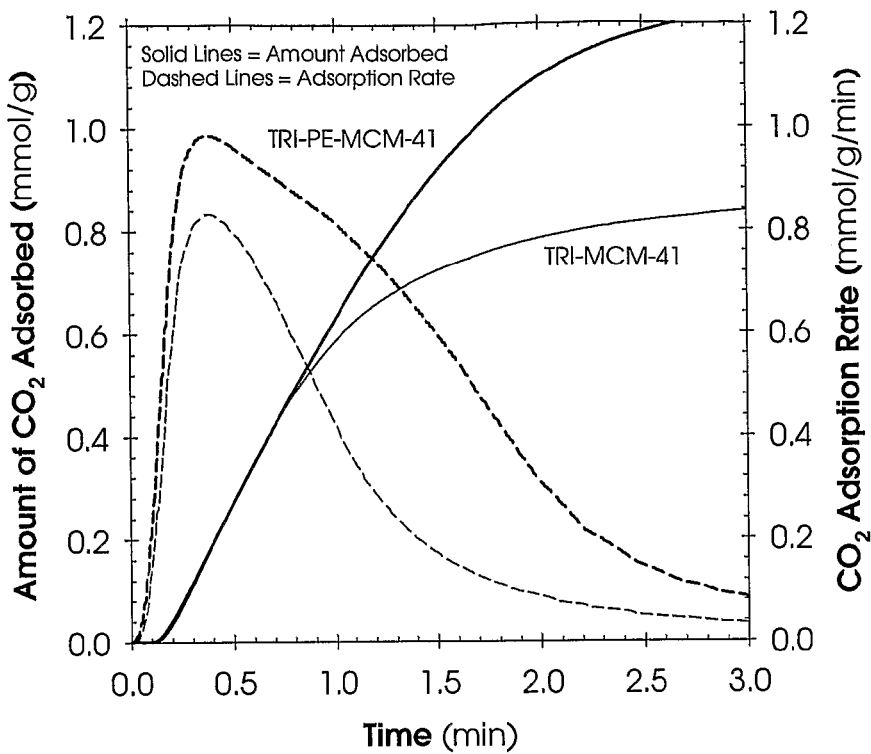
FIG. 15 shows an example of the dynamic adsorption uptake curves and adsorption rate for the optimal dry grafting of triamine-silane with MCM-41 and PE-MCM-41 supports with a 5% $CO_2/N_2$ feed mixture.

$CO_2$ Dynamic Adsorption Capacity: Most of the literature data has dealt with adsorption capacity on an equilibrium basis only. However, the dynamic regime of operation is equally, if not, more important as a material characteristic; since most applications of adsorption are only run to partial bed saturation due to the adsorption dynamics. Therefore, in this work the $CO_2$ adsorption capacity was determined as a function of time in all runs, and an example is shown in FIG. 15 for the TRI-MCM-41 and TRI-PE-MCM-41 materials. The dynamic data were calculated based on the weight gain vs. time as measured by the previously described TGA-MS. Each material shown in FIG. 15 was grafted using a 3.0 cc/g addition of the tri-amine silane. From the data shown in FIG. 15, the TRI-PE-MCM-41 material outperformed the TRI-MCM-41 material from both the dynamic and equilibrium points of view. Specifically, TRI-PE-MCM-41 exhibited a higher adsorption rate than the TRI-MCM-41 material. This increase in rate resulted in a slight increase in the amount of $CO_2$ adsorbed in the initial exposure time frame. As a consequence, the adsorption capacity of TRI-PE-MCM-41 was superior to TRI-MCM-41 at exposure times greater than 0.80 min. This behavior demonstrated the dynamic processing ability of the PE-MCM-41 support over the standard MCM-41 support. Further, desorption of $CO_2$ (not shown) was also rapid and complete at 100° C. with a $N_2$ purge (Purge/Feed ratio of 1.0). Typically, less than 5 minutes of purge at 100° C. was required to completely regenerate the material, which could be considered as the equivalent of a short time thermal pulse.

Figure 16:
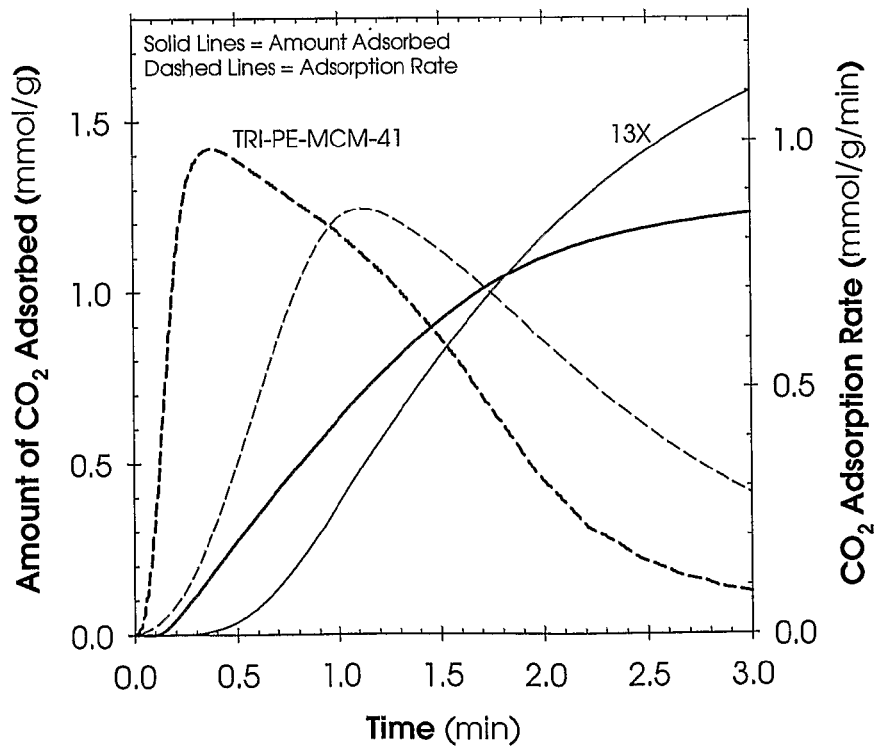
FIG. 16 shows an example of the dynamic adsorption uptake curves and adsorption rate for the optimal dry grafting of triamine-silane with PE-MCM-41 in comparison to zeolite 13X with a 5% $CO_2/N_2$ feed mixture.

Since the TRI-PE-MCM-41 material exhibited a high rate of adsorption, its performance was compared to 13X zeolite, and is shown in FIG. 16. The 13X adsorbent was also regenerated at 200° C. for 45 min prior to the $CO_2$ adsorption run in order to maintain the same initial regeneration thermal history as the TRI-grafted MCM-41 and PE-MCM-41 materials (see section on Material Adsorption Characteristics of example 2). From the data shown in FIG. 16, it is evident that the TRI-PE-MCM-41 outperformed the 13X material within the first 2 minutes of exposure. The offset of the amount adsorbed curve for the 13X zeolite to the TRI-PE-MCM-41 material is largely due to the $N_2$ adsorption capacity, and weakly on the mass transfer barriers of the two adsorbents. It is important to recall that each material was regenerated in pure $N_2$ prior to the introduction of the 5% $CO_2/N_2$ gas mixture. Therefore, for the 13X zeolite, approximately 0.40 mmol/g of $N_2$ was present on the adsorbent. When the $CO_2$ gas mixture was introduced, a competitive adsorption mechanism would dominate, where, the $CO_2$ would displace the pre-adsorbed $N_2$. In the initial stages of $CO_2$ exposure, the weight gain due to $CO_2$ adsorption is counterbalanced by the weight loss due to desorption of preadsorbed $N_2$. Further, since the pores of 13X are much smaller than those of PE-MCM-41, (i.e., 0.8 nm compared to 10 nm, respectively), a small lag could also exist due to the diffussional resistance. Therefore, in the initial time frame of exposure, the $CO_2$ adsorbate will encounter a greater resistance to mass transfer, and thus a delay in the uptake curve. By combining these arguments, the difference in uptake performance was demonstrated by the slow increase in the adsorption rate curve for the 13X zeolite from time zero, whereas, TRI-PE-MCM-41 exhibited an almost immediate adsorption rate response.

Figure 17:
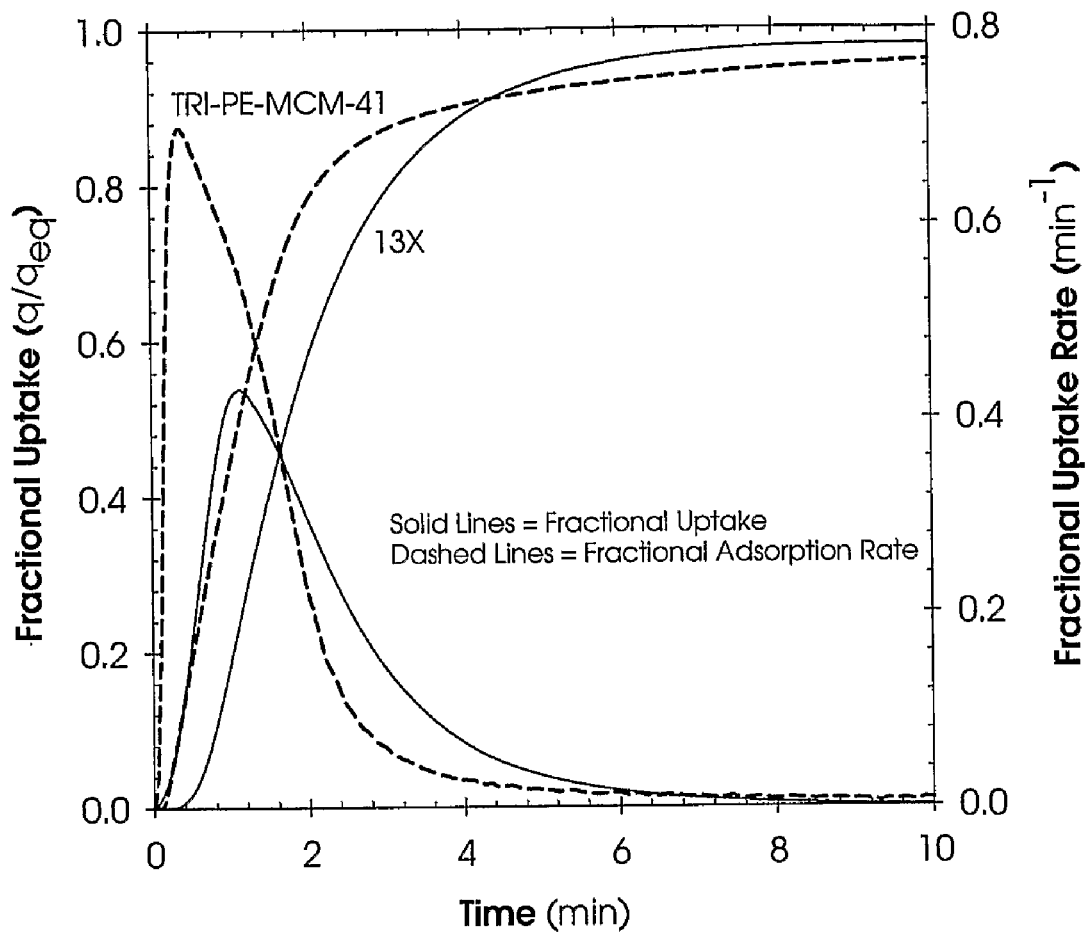
FIG. 17 shows an example of the dynamic adsorption fractional uptake curves and fractional adsorption rate for the optimal dry grafting of triamine-silane with PE-MCM-41 in comparison to zeolite 13X with a 5% $CO_2/N_2$ feed mixture.

Since the grafted material exhibited a lower equilibrium adsorption capacity than 13X, a further comparison was made on the basis of the fractional uptake (i.e., [amount adsorbed at time t]/[amount adsorbed at equilibrium]), and is shown in FIG. 17. From this data, it is still evident, that in the initial exposure to $CO_2$, the grafted material outperformed the 13X zeolite. This behavior will be most beneficial when applying the material for the separation of $CO_2$ in a rapid (cycle time <1.0 min), or ultra rapid (cycle time <5 sec) cyclic adsorption process, (for example see, U.S. Pat. No. 6,406,523, U.S. Pat. No. 6,451,095) since the $CO_2$ uptake within a very small time frame (ca. 1.5 minutes) is greater for the TRI-PE-MCM-41 material than the 13X zeolite.

When the exposure time was equal to 4.2 min, the TRI-PE-MCM-41 and 13X adsorbents both exhibited the same fractional uptake of ca. 90%. Beyond this point the 13X material reached a higher fractional uptake than the TRI-PE-MCM-41. This behavior is largely due to the slow secondary mechanisms of adsorption that may be occurring with the TRI-PE-MCM-41 material. For example, the primary amine site is known to react with $CO_2$ very rapidly, whereas the secondary amine sites are slower, and tertiary amine sites are very slow. While again not wishing to be bound by theory, it is, therefore, conceivable that the high initial adsorption rate is the result of $CO_2$ interaction with the primary amines, and the subsequent slow uptake after is due to the $CO_2$ interaction with the secondary amines. This contention is consistent with the dual mode response of the adsorption rate curve shown in FIG. 15 for the TRI-PE-MCM-41, as an inflection point at a time of 1.5 min, and not observed with the zeolite 13X.

Effect of Moisture: The effect of moisture was considered in this study to be an important factor, since most process streams contain moisture to a certain extent. For this study, the effect of moisture was evaluated by passing the feed mixture (either $N_2$, or the 5% $CO_2/N_2$) through a water containing saturator which was held isothermal at 5° C.; the inlet humidity was held constant at 26% RH. For both materials, the synthesis was carried out as previously described, where the silane addition was set as 3.0 cc/g.

The adsorption runs were performed by first adsorbing the moisture from the $N_2$ feed, to equilibrium, and then switching to the humid 5% $CO_2/N_2$ stream for the adsorption of $CO_2$. It was determined by MS, that upon the introduction of the humid 5% $CO_2/N_2$ stream, there was negligible desorption of the pre-adsorbed moisture, therefore, the adsorption of $H_2O$ and $CO_2$ could be considered as non-competitive.

The results of the $CO_2$+moisture runs are summarized in Table 5. From these data it is evident that the $CO_2$ adsorption capacity does not decrease in the presence of moisture, rather there is a slight increase in capacity. Further, in comparison to the 13X zeolite, the adsorption performance is far superior, in the presence of moisture.

TABLE 5

Summary of the dry and humid 5% $CO_2/N_2$ adsorption data.

| Material | Amount Grafted (mmol(N)/g) | Dry $CO_2$ (mmol/g) | $H_2O$ (mmol/g) | Humid $CO_2$ (mmol/g) |
|---|---|---|---|---|
| TRI-MCM-41 | 5.69 | 0.97 | 2.56 | 1.01 |
| TRI-PE-MCM-41 | 5.98 | 1.41 | 3.11 | 1.52 |

Example 3

Adsorbent prepared via post synthesis grafting: Comparison of Mono, Di, and Triamine grafting: The MCM-41 and PE-MCM-41 materials used in this example were prepared according to the methods described previously. All reagents used for the synthesis of grafted materials were purchased from Sigma-Aldrich and used as supplied with no further treatments. The following lists the compounds that were used with their respective purities and the acronym applied for identification in this study, water, distilled and di-ionized Toluene, 99% ACS grade, Pentane, 99% ACS Grade, 3-(aminopropyl)trimethoxysilane, 97% (referred to as MONO), [3-(2-aminoethylamino)propyl]trimethoxysilane, 97% (referred to as DI), 3-[2-(2-aminoethylamino)ethylamino] propyl-trimethoxysilane, Tech (referred to as TRI).

The amine functionality was introduced into the MCM-41-based materials via the post synthesis grafting technique. Two procedures were used. The first, and most common method is referred to as the dry technique (for example see Sayari and Hammoudi, 2001), and uses dry solvents under reflux. In a typical synthesis, a suspension of 1.0 g of the MCM-41 material in 150 cc of dry toluene (250 cc multi-neck flask) at room temperature was prepared, then a quantity of the amine based silane was added and the temperature was increased rapidly to the desired set temperature where it was held for 16 h, with reflux. The second procedure referred to as the wet technique, involved addition of a measured quantity of water to 150 cc of toluene and mixing for 15 min. Then 1.0 g of the MCM-41 material was added and allowed to equilibrate under stirring for 60 min. Finally, the required quantity of amine based silane was added and the temperature was increased to the desired set temperature and held for 16 h, with vapour reflux. All of the grafted materials were then filtered in a Büschner funnel with copious amounts of toluene and then pentane. The materials were subsequently dried at 120° C. in a natural convection oven for 4 h and stored in capped vials until use.

Material characterization: The support materials were characterized by $N_2$ adsorption-desorption measurements as described in examples 1 and 2, and shown in table 2. The thermal stability of all materials was investigated using a thermal gravimetric analyzer coupled with an in-line mass spectrometer (TGA-MS). The weight loss was monitored under flowing nitrogen, while the temperature was increased to 1000° C. at a rate of 10° C./min. In order to quantify the grafted content, the TGA weight loss profile, normalized to 100% at 200° C., was modified to account for the losses exhibited by the support material alone; in the temperature range of 200-1000° C. Using this corrected weight-loss, the amount of amine loading was calculated based on the amine-organic chain alone per gram of material.

The adsorption capacity and apparent rate were obtained using the same TGA-MS instrument mentioned earlier. For these adsorption runs, the feed flowrate was controlled at 150 sccm sample and 10 sccm balance purge. Using this balance, the materials response to a step change in $CO_2$ concentration (from 0.0 to 5% in $N_2$) was measured as the weight change relative to the condition of the material after thermal regeneration with $N_2$ purge. Thermal stability studies showed that with a regeneration condition of 200° C., there were no losses of the grafted amine. All the pure gases used in this study were purchased from Praxair Canada, and were specified as UHP grade. The 5% $CO_2/N_2$ mixture was also purchased from Praxair Canada as a certified UHP grade mixture.

Materials properties: With regard to thermal stability, TGA-MS experiments showed that under flowing nitrogen, all grafted amines were stable up to 250° C. (for example, see FIG. 10). All grafted materials exhibited only minor losses up to 300° C., in $N_2$. The materials did release the free methoxy side groups in the temperature range of 150-200° C., which accounted for 3-4 wt % of the total material mass. When each material was examined in air, the organic species were stable up to the decomposition temperature of 200° C.

$CO_2$ adsorption studies on dry vs. wet grafted materials: The first aspect examined in this study was the use of water during the grafting procedure. Conceptually, the dry grafting procedure can be considered as a reaction between the surface hydroxyl groups and the alkoxy groups of the silane compound leading ultimately to the formation of a surface layer of tethered amine functionalities. Accordingly it is assumed that all of the alkoxy groups would ideally react with the surface hydroxyl groups to liberate an alcohol, leading to the formation of multiple Si—O—Si bridges with the silica surface.

Figure 18:
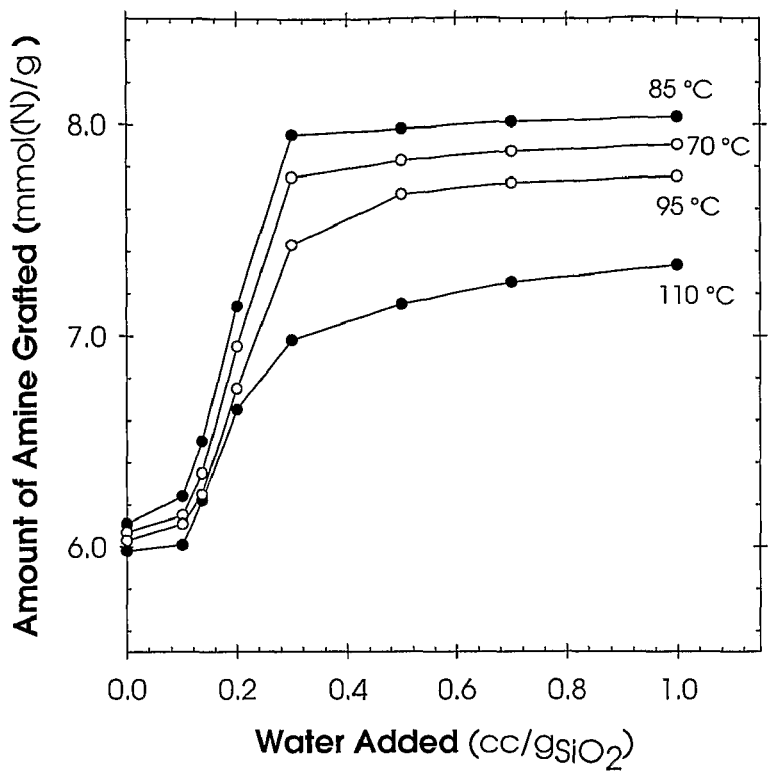
FIG. 18 shows the effects of temperature and quantity of water added to the grafting mixture on the resulting amount of triamine-silane grafted for the PE-MCM-41 support.
Figure 19:
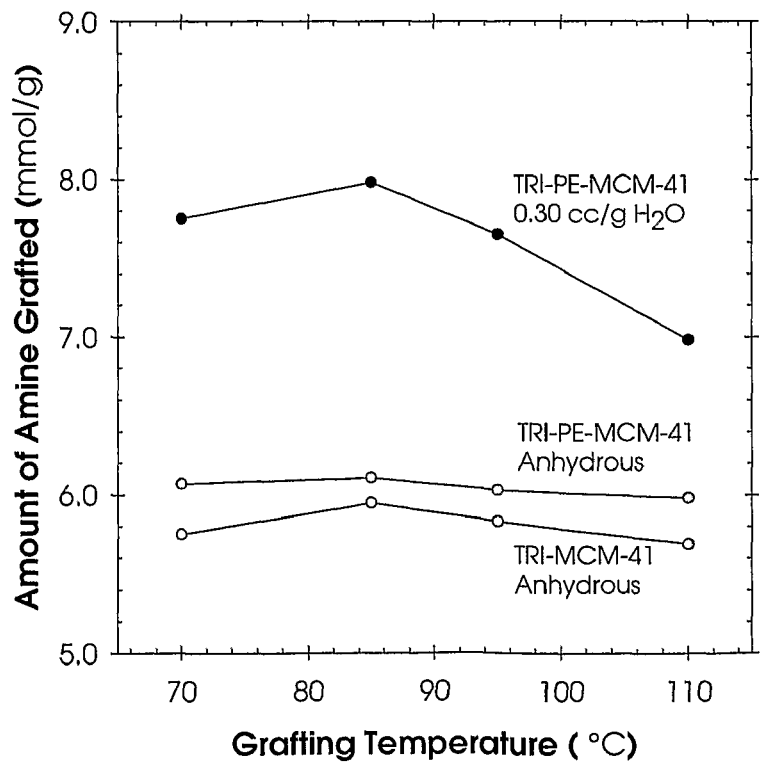
FIG. 19 is a plot of the total triamine content with PE-MCM-41 as a function of the reaction temperature for a constant water addition of 0.30 cc/g in comparison to the effects of temperature under anhydrous conditions with otherwise the conditions for TRI-MCM-41 and TRI-PE-MCM-41.

The first issue of grafting in the presence of water was to examine the effect of the quantity of water added on the amount of amine which could be grafted, at a given reaction temperature. For this two parameter analysis (water and temperature), the quantity of each type of amine silane added to the post-synthesis mixture was kept constant and in excess (3.0 cc/g($SiO_2$)). For this example, the triamine-silane (TRI) was used for illustration in detail and is shown in FIG. 18. From the data shown, it is evident that the amount of added water has a profound impact on the quantity of TRI which can be grafted, for all reaction temperatures examined. In all cases, as the amount of added water exceeded 0.30 cc/g ($SiO_2$), the amount grafted increased only slightly. However, if the amount of added $H_2O$ is limited to 0.30 cc/g($SiO_2$), as shown in FIG. 19, it is clear that the highest amount of amine grafted was obtained with a temperature of 85° C. The reasoning for this result could be due to the dependence on the rate of alkoxy consumption, both in the pores where the silane is able to react with the surface, and in the bulk solution, where the silane may polymerize due to the water content.

Figure 20:
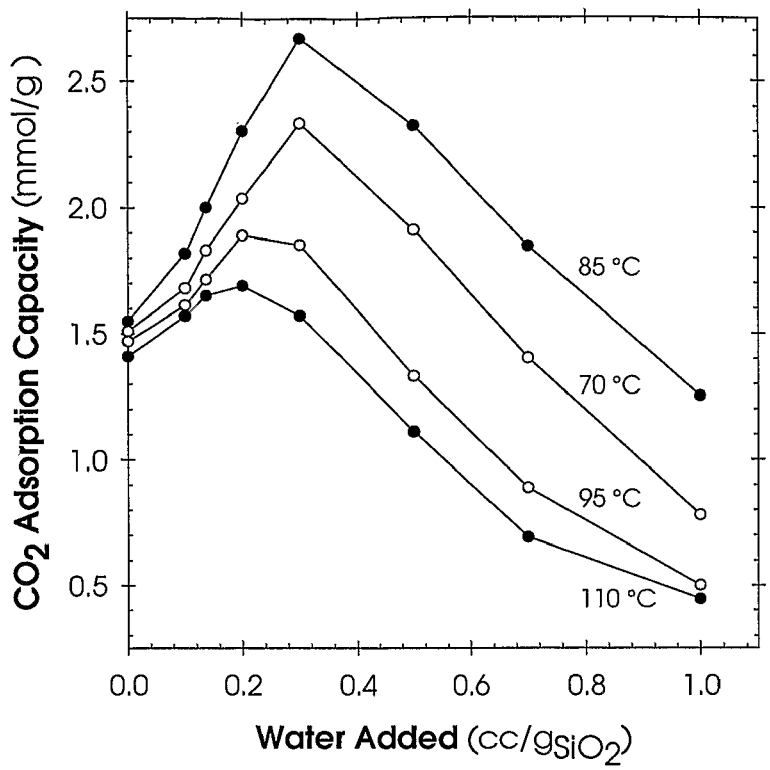
FIG. 20 shows the effect of the quantity of water added and grafting temperature on the 5% $CO_2/N_2$ adsorption capacity for the TRI-PE-MCM-41 adsorbent.
Figure 21:
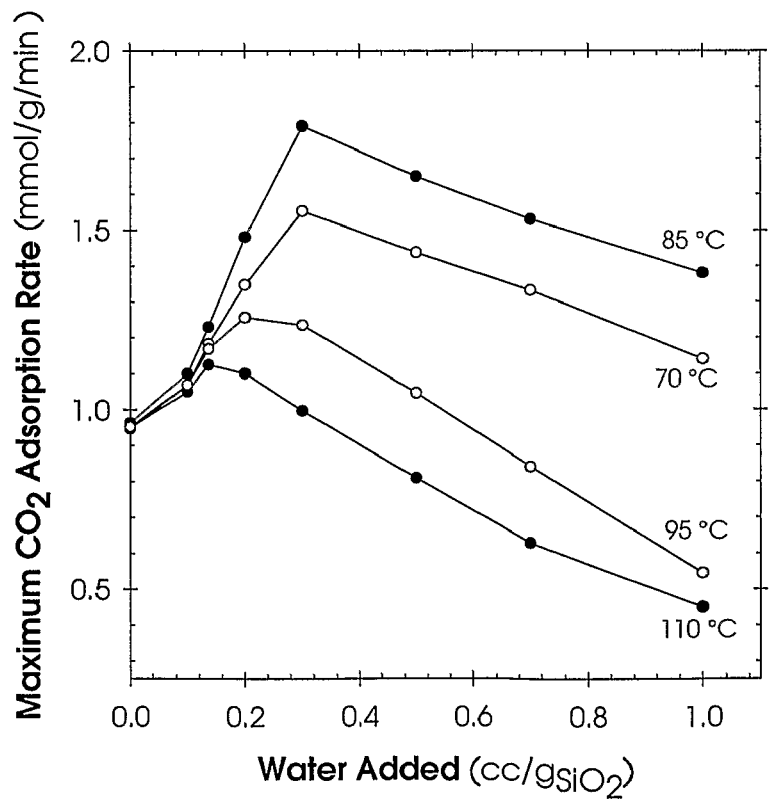
FIG. 21 shows the effect of the quantity of water added and grafting temperature on the 5% $CO_2/N_2$ maximum adsorption rate for the TRI-PE-MCM-41 adsorbent.

In order to verify that the grafted amine was accessible and active, adsorption tests were performed using a 5% $CO_2$ in $N_2$ gas mixture. The results are shown in FIG. 20 in terms of adsorption capacity vs. amount of water added. Prior to each adsorption test, the material was regenerated at 200° C. for 45 min. It is seen that as the amount of water added increased above 0.30 cc/g($SiO_2$), the $CO_2$ adsorption performance decreased, even though the amount of grafted amine was increasing (FIG. 18). To further examine these trends, the apparent adsorption rate obtained from the adsorption runs was plotted as a function of water added (FIG. 21). From this data it is evident that as the adsorption capacity decreased, the adsorption rate also decreased. By combining these results, the general conclusion is that water addition above 0.30 cc/g ($SiO_2$) results in pore blockage possibly due to the polymerization of the silane in the bulk solution, and subsequent deposition on the external surface of the support.

Figure 22:
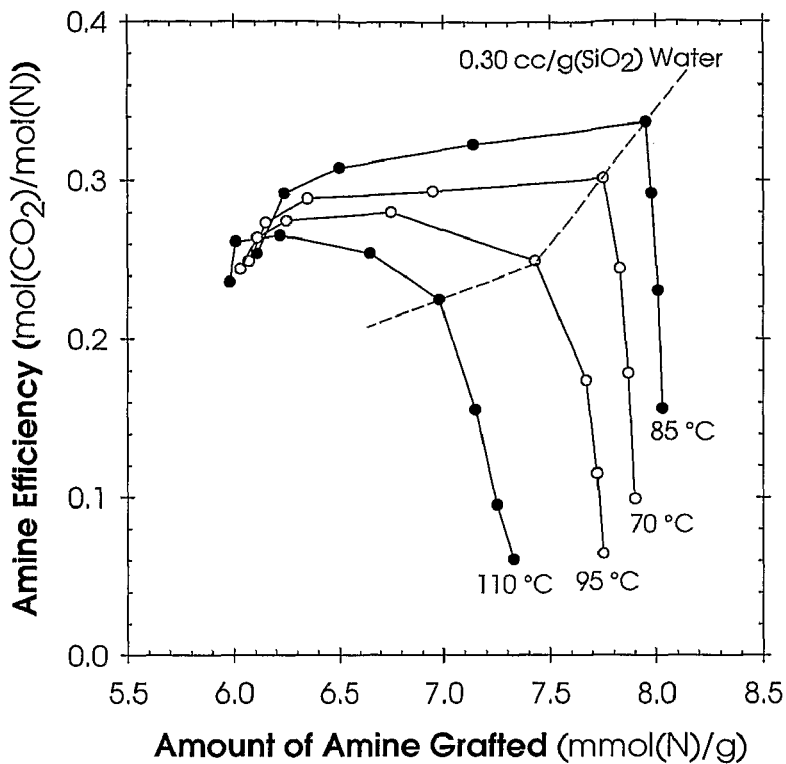
FIG. 22 shows the effect of the quantity of water added and grafting temperature on the amine efficiency ($CO_2$/N molar ratio), for 5% $CO_2/N_2$ adsorption as a function of the amount of triamine grafted for the PE-MCM-41 support.

Another factor to examine when using amines to adsorb $CO_2$ is the so-called $CO_2/N$ ratio, which represents the molar amount of $CO_2$ adsorbed per the molar amount of grafted amine. Under the assumption of carbamate formation, this ratio should be 0.5 for dry $CO_2$ adsorption, and 1.0 for humid $CO_2$ adsorption due to the formation of carbonate and bicarbonate. The ratios obtained for this work are shown in FIG. 22 as a function of the amount of amine grafted and the grafting temperature. The data points represent the various amine loadings obtained by varying the amount of water added to the grafting mixture, from 0 to 1.0 cc/g.

From this data, it is evident that the grafting temperature of 85° C. produced a superior functionalized state in comparison to those obtained at the other temperatures applied. However, the $CO_2/N$ ratios are still significantly below the ideal 0.50 value for dry $CO_2$ adsorption. At each grafting temperature the effect of the amount water added resulted in materials with higher $CO_2/N$ ratios than the anhydrous grafted materials (the initial point for each curve), up to a certain level as follows, for 85° C.<0.50 cc/g, 70 and 95° C.<0.30 cc/g, and for 110° C.<0.135 cc/g.

The cause of the lower than expected $CO_2/N$ ratios may be due to several reasons. First, the reaction is weakly sensitive to the partial pressure of $CO_2$; in this study, low partial pressure $CO_2$ (5.1 kPa) was used. Further, the amine-$CO_2$ interaction may be hindered by the possibility of amine hydrogen bonding, leading to a reduced amount of amine groups available for $CO_2$ adsorption. However, the TRI-PE-MCM-41 materials did exhibit higher $CO_2/N$ ratios than the TRI-MCM-41 materials (see Table 3), which is most likely due to the increased pore volume and pore diameter which lead to less possibility of the amine chain conforming in such a way as to interact with the surface via the amine functional group. Conversely, the increase in $CO_2/N$ ratio, over the materials grafted under dry conditions, could be due to the higher density of grafted amine, and thus afford the carbamate more readily.

Effect of grafted aminosilane type under optimal reaction conditions: For all amine types, the optimal grafting temperature was found to be 85° C. However, the optimal amount of water added to the reaction mixture was higher for the mono-amine (0.44 cc/g($SiO_2$)) silane than the di and tri-amine silanes (0.3 cc/g($SiO_2$)). Overall, the results of the study showed that very high amine loadings, and associated adsorption capacities of the various materials were obtained when exposed to a 5% $CO_2/N_2$ gas mixture. For the mono-amine, an optimal grafted quantity of 4.31 mmol(N)/g (5.75 mmol(N)/$g_{SiO2}$) was obtained with a corresponding 2.35 mmol/g (104 mg/g) of 5% $CO_2$ in $N_2$ adsorbed at equilibrium. The maximum apparent adsorption rate for this material was also very high; 1.16 mmol/g/min (51 mg/g/min).

The optimal grafting with DI produced an amine content of 6.16 mmol(N)/g (8.94 mmol(N)/$g_{SiO2}$), with a corresponding CO$_2$ adsorption equilibrium capacity of 2.58 mmol/g (113 mg/g), and the apparent adsorption rate increased to 1.57 mmol/g/min (69 mg/g/min). The results for this material show that the increase in the active amine content per grafted chain only produced a slight increase in the equilibrium CO$_2$ adsorption capacity, and the maximum apparent adsorption rate, with a subsequent decrease in the CO$_2$/amine ratio.

When TRI was optimally grafted, an amine loading of 7.95 mmol(N)/g (12.9 mmol(N)/g$_{SiO2}$) was obtained. In comparison to the diamine coated material, the equilibrium adsorption capacity increased to 2.67 mmol/g (117 mg/g), and the maximum rate also increased to 1.79 mmol/g/min (88 mg/g/min).

Figure 23:
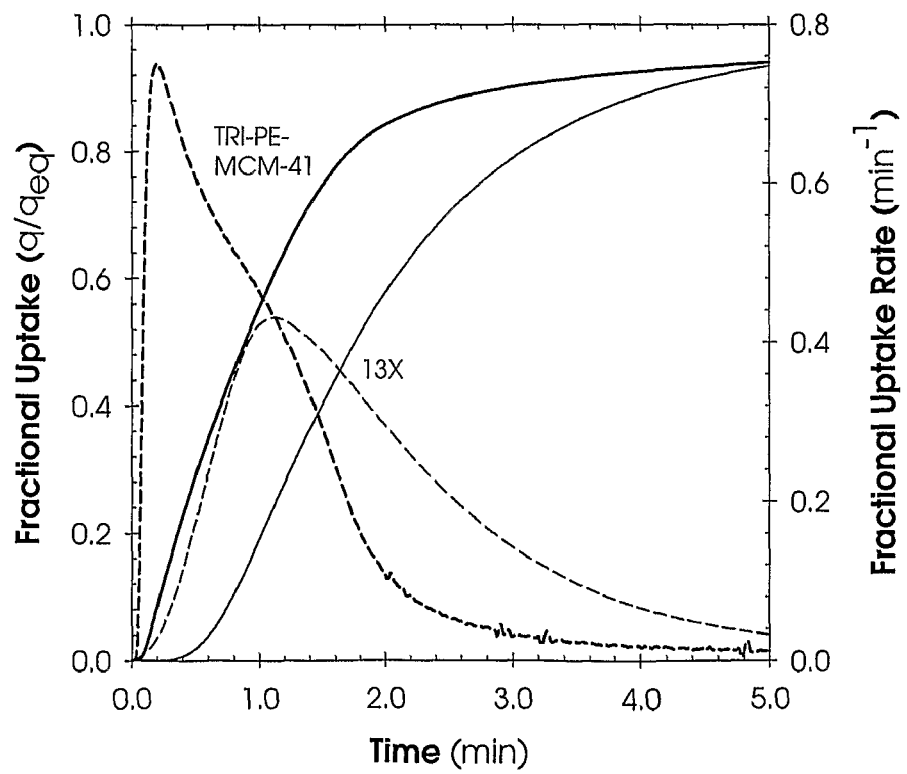
FIG. 23 is a plot of the dynamic fractional adsorption capacity (solid lines) and fractional adsorption rate (dashed lines) of the optimal grafted TRI-PE-MCM-41 and zeolite 13X with a 5% $CO_2/N_2$ feed mixture.
Figure 24:
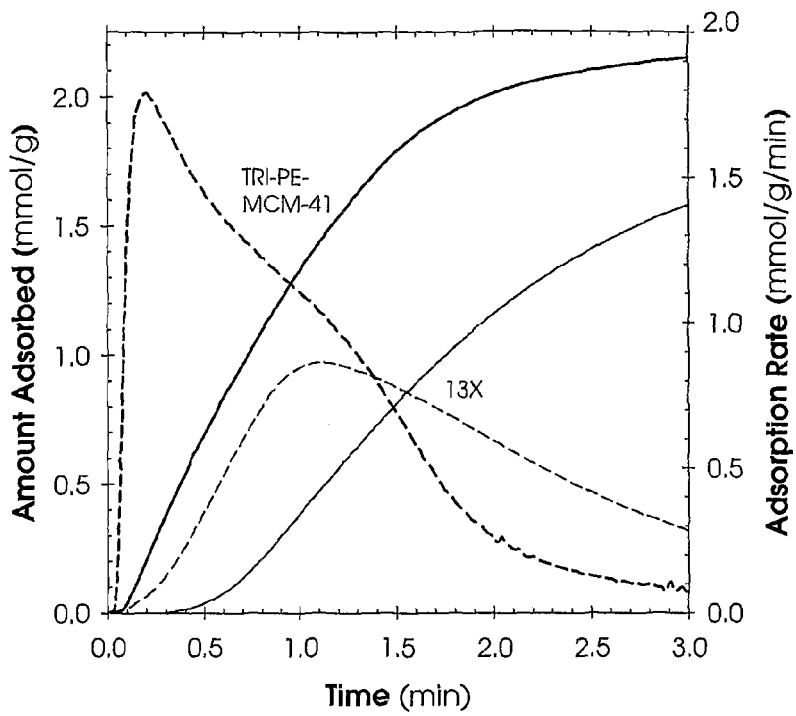
FIG. 24 is a plot of the dynamic adsorption capacity (solid lines) and adsorption rate (dashed lines) of the optimal grafted TRI-PE-MCM-41 and zeolite 13X with a 5% $CO_2/N_2$ feed mixture.

The dynamic response of material containing optimum amount of grafted triamine is shown in FIGS. 23 and 24. This material was challenged with a 5% CO$_2$/N$_2$ feed mixture, and the dynamic amount adsorbed was recorded and compared to the same response exhibited by zeolite 13X. As shown in FIG. 23, the fractional uptake for the triamine grafted material is superior when the exposure time is less than 5 min. Beyond this time, the two materials exhibit similar approaches to complete saturation. However, the triamine grafted material adsorbed a larger amount of CO$_2$ (2.67 mmol/g) than the 13X material (2.05 mmol/g), when regenerated at 200° C. The specific amount adsorbed and the associated adsorption rates are shown in FIG. 24. From these data, it is evident that the triamine grafted material is far superior in terms of the specific amount adsorbed, especially, upon initial contact with the feed gas mixture. Therefore, it should be appreciated by one skilled in the art, that the present invention will have a profound impact on the rates at which a cyclic adsorption process (i.e., rapid pressure swing adsorption system or an ultra rapid pressure swing adsorption) may operate based on the rapid adsorption kinetics observed with the optimally grafted TRI-PE-MCM-41 adsorbent, especially in comparison to 13X zeolite as the baseline material, as shown in FIG. 24.

It is also interesting to observe that the 13X zeolite exhibited a delayed response to the 5% CO$_2$ feed mixture, as noted by the offset of the uptake curve even and the slow increase in the rate. This behaviour may be due to the competitive adsorption effects of N$_2$, which was pre-adsorbed on the material, or a consequence of pore diffusion. This type of behaviour was not observed with the triamine grafted material since it does not exhibit N$_2$ adsorption, and the pore structure is such that diffusion limitations are greatly reduced.

By exposing the material to a N$_2$ stream saturated at 4-5° C. with water (27-28% relative humidity at 25° C.), and then switching the gas supply to the 5% CO$_2$/N$_2$ gas mixture at the same humidity, the effects of both adsorbed components were examined. The results showed that the CO$_2$ adsorption capacity only slightly increased in the presence of this level of moisture; c. a. 3% increase with MONO, 7% with DI and 10% with TRI. Further, the materials were cyclically capable of regenerating both the adsorbed moisture and CO$_2$ completely at 75° C. with a dry N$_2$ purge. When the 13X was exposed to the same cyclic conditions, only a portion of the water capacity could be recovered, and therefore, the CO$_2$ equilibrium capacity remained unchanged (0.08 mmol/g).

Example 4

Adsorption properties as a function of CO$_2$ pressure: Another important property of any adsorbent is the ability to adsorb the targeted gas(es) at various inlet pressures. The measure of the adsorption capacity as a function of the adsorbate pressure at constant temperature is termed the adsorption isotherm. In this work, a modified magnetic suspension balance (Rubotherm, Germany) has been used to determine the weight gain of the adsorbent as a function of the inlet pressure of the targeted adsorbate, CO$_2$.

Figure 25:
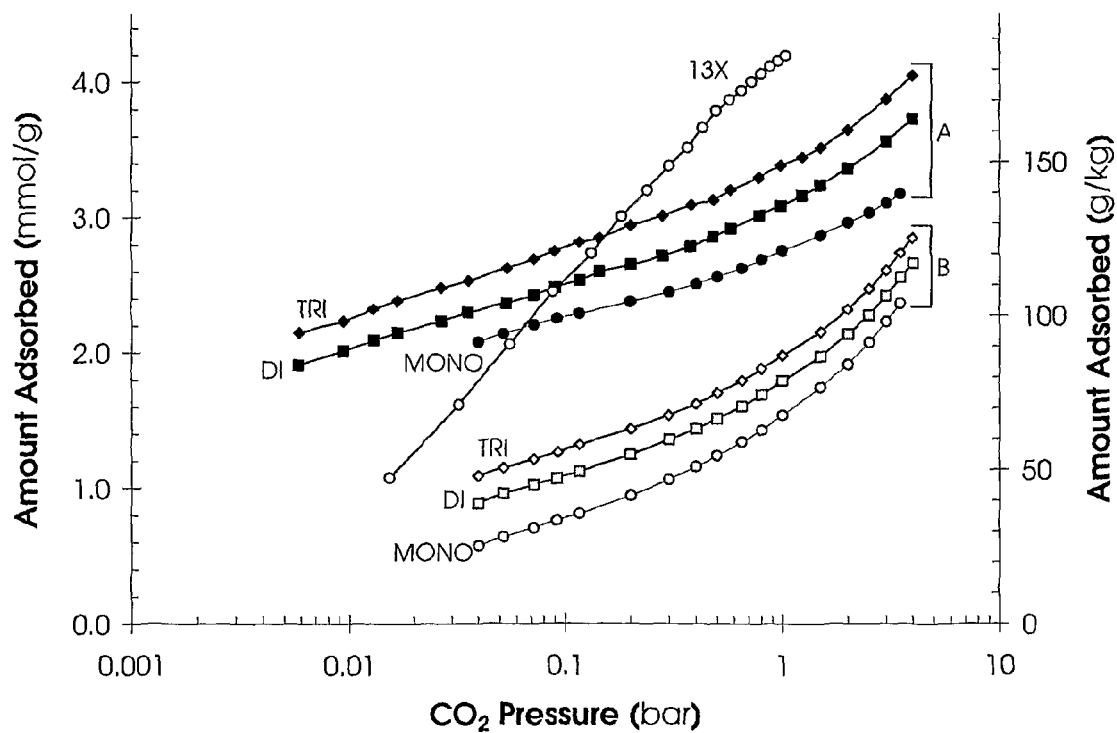
FIG. 25 shows the adsorption isotherms for the adsorbents prepared under the conditions of optimal grafting (A) described in example 3, and those prepared under anhydrous grafting (B) under otherwise the same conditions as (A). All materials were regenerated in-situ under flowing UHP He at 200° C. and $10^{-4}$ torr pressure for 6 hours prior to their use.

The adsorption isotherms for the optimal mono, di, and triamine grafted adsorbents (A) previously described in example 3, and those prepared by dry grafting (B) under otherwise the same conditions as (A), were determined at a temperature of 25° C., and are shown in FIG. 25. From this data, it is obvious that the present invention produces adsorbents with superior characteristics over the corresponding materials prepared under anhydrous conditions. Further, in comparison to the 13X zeolite, the present invention exhibits superior adsorption capacity at CO$_2$ pressures below 0.06 bar for the mono-amine grafted material described in example 3, below 0.09 bar for the DI grafted material from example 3, and below 0.15 bar for the TRI containing material described in example 3. Further, the difference in the adsorption capacity between the adsorbent of the present invention and the 13X zeolite is further enhanced as the CO$_2$ pressure decreases. For example at a CO$_2$ pressure of 0.015 bar, the difference between the 13X zeolite and the TRI-Example 3 material is ca. 1.36 mmol/g, where the 13X adsorption capacity is ca. 1.07 mmol/g, and that of the TRI-Example 3 material is ca. 2.33 mmol/g. This enhanced adsorption capacity in combination with the enhanced adsorption rate of the adsorbent of the present invention, offers many advantages to the dynamic and equilibrium based separation process development strategies, and may offer unique advantages to the separation of CO$_2$ from process streams where CO$_2$ removal has not been previously viable due to the commercially available adsorbent properties under these low pressure conditions.

REFERENCES

G. Astarita, D. W. Savage and A. Bisio, *Gas Treating with Chemical Solvents*, John Wiley, NY, 1983.

G. A. Attard, J. C. Glyde and C. G. Göltner, *Nature* 378 (1995) 366.

H. Bai and A. C. Yeh, *Ind. Eng. Chem. Res.* 36 (1997) 2490.

S. A. Bagshaw, E. Prouzet and T. J. Pinnavaia, *Science* 269 (1995) 1242.

J. S. Beck, J. C. Vartuli, W. J. Roth, M. E. Leonowicz, C. T. Kresge, K. D. Schmitt, C.T-W. Chu, D. H. Olson, E. W. Sheppard, S. B. McCullen, J. B. Higgins and J. L. Schlenker, *J. Am. Chem. Soc.* 114 (1992) 10834.

S. Che, A. E. Garia-Bennett, T. Yokoi, K. Sakamoto, H. Kumieda, O. Terasaki and T. Tatsumi, *Nature Mater.* 2 (2003) 801.

A. C. C. Chang, S. S. C. Chuang, M. Gray and Y. Soong, *Energy and Fuels* 17 (2003) 468.

T. W. Chien and H. Chu, *J Hazard. Mater.* 80 (2000) 43.

K. T. Chue, J. N. Kim, Y. J. Yoo, S. H. Cho and R. T. Yang, *Ind. Eng. Chem. Res.* 34 (1995) 591.

S. Contarini, M. Barbini, G. Del Piero, E. Gambarotta, G. Mazzamurro, M. Riocci and P. Zappelli, In *Greenhouse Gas Control Technologies—6th International Conference*, Gale, J., Kaya, Y., Eds., Tribology Series Volume 41, Elsevier: New York, N.Y., 1 (2003) 169.

D. Eden and M. Luckas, *Chem. Eng. Technol.* 21 (1998) 1.

J. Fan, C. Yu, F. Gao, J. Lei, B. Tian, L. Wang, Q. Luo, B. Tu, W. Zhou and D. Zhao, *Angew. Chem. Int. Ed. Engl.* 42 (2003) 3146.

X. Feng, G. E. Fryxell, L. Q. Wang, A. Y. Kim, J. Liu, and K. M. Kemner, *Science*, 276 (1997) 923.

Firouzi, A. Monnier, L. M. Bull, T. Besier, P. Sieger, Q. Huo, S. A. Walker, J. A. Zasadzinski, C. Glinka, J. Nicol, D. Margolese, G. D. Stucky and B. F. Chmelka, *Science* 267 (1995) 1138.

A. M. Fonseca, J. J. Orfao and R. L. Salcedo, *Ind. Eng. Chem. Res.* 40 (2001) 304.

J. Frew and D. J. Eaton, *Report DCIEM* 95-16, Defence and Civil Institute of Medicine: North York, Canada, (1995).

A. E. Garia-Bennett, O. Terasaki, S. Che and T. Tatsumi, *Chem. Mater.* 16 (2004) 813.

Y. Han, D. Li, L. Zhao, J. Song, X. Yang, N. Li, Y. Di, C. Li, S. Wu, X. Xu, X. Meng, K. Lin and F.-S. Xiao, *Angew. Chem. Int. Ed. Engl.* 42 (2003) 3633.

R. J. Hook, *Ind. Eng. Chem. Res.* 36 (1997) 1779.

H. Huang, R. Yang, D. Chinn and C. L. Munson, *Ind. Eng. Chem. Res.* 42 (2003) 2427.

A. C. C. Chang, S. S. C. Chuang, M. Gray and Y. Soong, *Energy and Fuels* 17 (2003) 468.

Q. Huo, R. Leon, P. M. Petroff and G. D. Stucky, *Science* 268 (1995) 1324.

Q. Huo, D. I. Margolese and G. D. Stucky, *Chem. Mater.* 8 (1996) 1147.

F. Kleitz, D. Liu, G. M. Anilkumar, I.-S. Park, L. A. Solovyov, A. N. Shmakov and R. Ryoo, *J. Phys. Chem. B.* 107 (2003) 14296.

F. Kleitz, S. H. Choi and R. Ryoo, *Chem. Commun.* (2003) 2136.

S. S. Kim, W. Zhang and T. J. Pinnavaia, *Science* 282 (1998) 1302.

C. A. Koh, T. Montanari, R. I. Nooney, S. F. Tahir and R. E. Westacott, *Langmuir* 15 (1999) 6043.

A. Kohl and R. Nielsen, *Gas Purification*, Gulf Publ. Co, TX, USA, 1997.

M. Kruk, M. Jaroniec and A. Sayari, *Langmuir* 13 (1997) 6267.

M. Kruk, M. Jaroniec and A. Sayari, *J. Phys. Chem. B.* 103 (1999) 4590.

M. Kruk, M. Jaroniec and A. Sayari, *Microporous Mesoporous Mater* 35-36 (2000) 545.

M. Kruk, M. Jaroniec, V. Antochshuk and A. Sayari, *J. Phys. Chem. B.* 106 (2002) 10096.

O. Leal, C. Bolivar, C. Ovalles, J. J. Garcia and Y. Espidel, *Inorg. Chim. Acta.* 240 (1995) 183.

X. Liu, B. Tian, C. Yu, F. Gao, S. Xie, B. Tu, R. Che, L.-M. Peng and D. Zhao, *Angew. Chem. Int. Ed. Engl.* 41 (2002) 3876.

S. Lynn, A. L. Schiozer, W. L. Jaecksch, R. Cos and J. M. Prausnitz, *Ind. Eng. Chem. Res.* 35 (1996) 4236.

B. L. Newalkar, S. Komarneni, U. T. Turaga and H. Katsuki, *J. Mater. Chem.* 7 (2003) 1710.

T. J. Overcamp, *Environ. Sci. Technol.,* 33 (1999) 155.

E. Prouzet, F. Cot, G. Nabias, A. Larbot, P. Kooyman and T. J. Pinnavaia, *Chem. Mater.* 11 (1999) 1498.

E. Rinker, S. S. Ashour and O. C. Sandall, *Ind. Eng. Chem. Res.* 39 (2000) 4346.

R. Ryoo, I.-S. Park, S. Jun, C. W. Lee, M. Kruk and M. Jaroniec, *J. Am. Chem. Soc.* 123 (2001) 1650.

Y. Sakamoto, M. Kaneda, O. Terasaki, D. Zhao, J. M. Kim, G. D. Stucky, H. J. Shin and R. Ryoo, *Nature* 408 (2000) 449.

G. Sartori and D. W. Savage, *Ind. Eng. Chem. Res.* 22 (1983) 239.

S. Satyapal, T. Filbum, J. Trela and J. Strange, *Energy and Fuels* 15 (2001) 250.

A. Sayari, *Stud. Surf. Sci. Catal.* 102 (1996) 1.

A. Sayari, M. Kruk, M. Jaroniec and I. L. Moudrakovski, *Adv. Mater.* 10 (1998) 1376.

A. Sayari, Y. Yang, M. Kruk and M. Jaroniec, *J. Phys. Chem. B.* 103 (1999) 3651.

A. Sayari, *Angew. Chem. Int. Ed. Engl.* 39 (2000) 2920.

A. Sayari and Y. Yang, *J. Phys. Chem. B.* 104 (2000) 4835.

A. Sayari and S. Hamoudi, *Chem. Mater.* 13 (2001) 3151.

A. Sayari, S. Hamoudi and Y. Yang, *Chem. Mater.* 17 (2005) 212.

P. Schmidt-Winkel, W. W. Lukens, Jr., D. Zhao, P. Yang, B. F. Chmelka and G. D. Stucky, *J. Am. Chem. Soc.* 121 (1999) 254.

S. Shen, Y. Li, Z. Zhang, J. Fan, B. Tu, W. Zhou and D. Zhao, *Chem Commun.* (2002) 2212.

C. Song, A. M. Gaffney and K. Fujimoto, (eds.), $CO_2$ *Conversion and Utilization,* American Chemical Society Washington, D.C., (2002).

D. Thomas and J. Vanderschuren, *Chem. Eng. Tech.* 23 (2000) 449.

P. T. Tanev, Y. Liang and T. J. Pinnavaia, *J. Am. Chem. Soc.* 119 (1997) 8616.

P. T. Tanev and Pinnavaia, *Science* 267 (1995) 865.

A. Veawab, P. Tontiwachwuthikul and A. Chakma, *Ind. Eng. Chem. Res.* 38 (1999) 3917.

X. Xu, C. Song, J. M. Andrésen, B. G. Miller and A. W. Scaroni, *Energy and Fuels* 16 (2002) 1463.

X. Xu, C. Song, J. M. Andrésen, B. G. Miller and A. W. Scaroni, *Microporous Mesoporous Mater.* 62 (2003) 29.

T. Yanagisawa, T. Shimizu, K. Kuroda and C. Kato, *Bull. Chem. Soc. Jpn.* 63 (1990) 988.

C. Yu, Y. Yu and D. Zhao, *Chem. Commun.* (2000) 575.

D. Zhao, Q. Huo, J. Feng, J. Kim, Y. Han and G. D. Stucky, *Chem. Mater.* 11 (1999) 2668.

D. Zhao, Q. Huo, J. Feng, B. F. Chmelka and G. D. Stucky, *J. Am. Chem. Soc.* 120 (1998) 6024.

D. Zhao, Q. Huo, J. Feng, B. F. Chmelka and G. D. Stucky, *Science* 279 (1998) 548.

L. Zhou, L. Zhong, M. Yu and Y. Zhou, *Ind. Eng. Chem. Res.* 43 (2004) 1765.

PATENTS

V. Haensel, U.S. Pat. No. 2,818,323 (1957).

G. R. Stoneburner U.S. Pat. No. 3,491,031 (1970).

H. Zinnen, A. R. Oroskar, C. H. Chang, U.S. Pat. No. 4,810,266 (1989).

E. Vansant, G. Peeters, P. de Bievre, R. van Gompel, U.S. Pat. No. 4,999,175 (1991).

O. Leal, C. Bolivar, G. Sepulveda, G. Molleja, G. Martinez, U.S. Pat. No. 5,087,597 (1992).

C. T. Bridges, C. R. Howe, J. B. Paine, III, K. F. Podraza, U.S. Pat. No. 5,527,517 (1996).

P. J. Birbara, T. P. Filburn, T. A. Nalette, U.S. Pat. No. 5,876,488 (1999).

X. Feng, J. Liu, G. E. Fryxell, U.S. Pat. No. 6,326,326 (2001).

P. J. Birbara, T. P. Filburn, H. Michels, T. A. Nalette, U.S. Pat. No. 6,364,938, (2002).

D. Connor, D. G. Doman, L. Jexiorowski, B. Keefer, B. Larisch, C. McLean, and I. Shaw, U.S. Pat. No. 6,406,523 (2002).

B. Keefer, D. Doman, C. McLean, U.S. Pat. No. 6,451,095, (2002).

G. E. Fryxell, T. S. Zemanian, J. Liu, Y. Shin, U.S. Pat. No. 6,531,224 (2003).

M. L. Gray, Y. Soong, K. J. Champagne, U.S. Pat. No. 6,547,854 (2003).

C. G. Chang, U.S. Pat. No. 6,670,304 (2003).

E. W. Hodgson, U.S. Pat. No. 6,709,483 (2004).

G. E. Fryxell, T. S. Zemanian, J. Liu, Y. Shin, U.S. Pat. No. 6,733,835 (2004).

T. A. Nalette, W. Papale, T. Filburn, U.S. Pat. No. 6,755,892 (2004).

G. E. Fryxell, T. S. Zemanian, J. Liu, Y. Shin, U.S. Pat. No. 6,846,554 (2005).

FOREIGN PATENTS

G. del Piero, P. Zappelli, M. Riocci, S. Contarini, Ital. ITMI20020536 (2003).

L. Zhou, Y. P. Zhou, Chinese 02117914 (2003).

All publications, patents and patent applications mentioned in this Specification are indicative of the level of skill of those skilled in the art to which this invention pertains and are herein incorporated by reference to the same extent as if each individual publication, patent, or patent applications was specifically and individually indicated to be incorporated by reference.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The embodiments of the invention in which an exclusive property or privilege is claimed are defined as follows:

1. A mesoporous support having a pore volume of between 0.7 and 3.6 cc/g, a median pore diameter of between 1 and 25 nm, and a BET surface area of between 500 and 1600 m$^2$/g, wherein said support is a pore-expanded mesoporous silica or organosilica, which is functionalized by covalent attachment of compounds containing acid-gas reactive functional groups within the pores of said support.

2. A regenerable acid-gas adsorbent comprising the mesoporous support of claim 1.

3. The acid-gas adsorbent of claim 2, wherein said acid-gas reactive functional groups are amino groups.

4. The acid-gas adsorbent of claim 3, wherein said functional groups are added by grafting of silane compounds containing said functional groups to said mesoporous support.

5. The acid-gas adsorbent of claim 4, wherein said silane compounds are alkoxy-silane compounds, chloro-silane compounds, silanol compounds, or any combination thereof.

6. The acid-gas adsorbent of claim 5, wherein said alkoxy-silane compounds are selected from the group consisting of aminopropyl-methyl-dimethoxysilane, amino-propyl-trimethoxysilane, aminoethylaminopropyl-methyl-dimethoxysilane, aminoethylaminopropyl-trimethoxysilane, aminoethylaminoethylaminopropyl-methyl-dimethoxysilane, aminoethylaminoethylaminopropyl-trimethoxysilane and combinations thereof.

7. The acid-gas adsorbent of claim 4, wherein said grafting is performed in the presence of water.

8. The acid-gas adsorbent of claim 3, wherein said functional groups are added by grafting of 3-[2-(2-aminoethylamino)ethylamino]propyl-trimethoxysilane.

9. The acid-gas adsorbent of claim 3, wherein said functional groups are added by grafting of [3-(2-aminoethylamino)propyl]trimethoxysilane.

10. The acid-gas adsorbent of claim 3, wherein said functional groups are added by grafting of 3-(aminopropyl)trimethoxysilane.

11. The acid-gas adsorbent of claim 3, wherein said adsorbent has a $CO_2$ equilibrium adsorption capacity of at least 1.4 mmol/g under dry conditions.

12. A method for removing or recovering acid gas from an gaseous stream or atmosphere containing said acid gas, comprising the step of contacting the gaseous stream or atmosphere with an adsorbent according to claim 2.

13. The method according to claim 12, for use in a confined space closed loop system, a fossil fuel combustion process, a biogas combustion process, a biogas derived process, a natural gas treatment process, an industrial process or a chemical production process.

14. A process for manufacturing an adsorbent according to claim 2, comprising:
  (a) providing the mesoporous support material; and
  (b) grafting a functionalization compound, which contains one or more acid-gas reactive groups, to the surface of the pores of said support material; or
  (c) directly loading a functionalization compound, which contains one or more acid-gas reactive groups, into the pores of said support material.

15. The process according to claim 14, wherein the grafting step (b) comprises:
  (i) suspending said support material in a solvent;
  (ii) adding an amount of said functionalization compound to the suspension formed in step (i); and
  (iii) maintaining the mixture formed in step (ii) at a functionalization temperature for a set time period to produce said adsorbent.

16. The process according to claim 15, wherein said functionalization compound is an alkoxy-silane compound, a chloro-silane compound, a silanol compound, or any combination thereof.

17. The process according to claim 16, wherein said alkoxy-silane compound is selected from the group consisting of aminopropyl-methyl-dimethoxysilane, aminopropyl-trimethoxysilane, aminoethylaminopropyl-methyl-dimethoxysilane, aminoethylaminopropyl-trimethoxysilane, aminoethylaminoethylaminopropyl-methyl-dimethoxysilane, aminoethylaminoethylaminopropyl-trimethoxysilane and combinations thereof.

18. The process according to claim 16, wherein the ratio of silane compound to said support material is in the range of 0.0001 to 10 (volume/weight).

19. The process according to claim 15, wherein a temperature ratio is in the range of 0.1 to 1.0, said temperature ratio being the ratio of the functionalization temperature to the boiling point of said solvent.

20. The process according to claim 19, wherein said solvent is toluene and said temperature ratio is in the range of 0.68 to 0.82.

21. The process according to claim 15, wherein water is added to the suspension formed in step (i) prior to the addition of said functionalization compound in step (ii).

22. The process according to claim 21, wherein said functionalization compound is an alkoxy-silane compound, said solvent is toluene and the ratio of the molar amount of water added to the molar amount of alkoxy groups present in said alkoxy-silane compound is in the range of 0.0 to 1.0.

* * * * *